(12) United States Patent
Nemoto et al.

(10) Patent No.: US 12,514,975 B2
(45) Date of Patent: Jan. 6, 2026

(54) CHEMICAL LIQUID INJECTING APPARATUS

(71) Applicant: CIRCULUS INC., Tokyo (JP)

(72) Inventors: Shigeru Nemoto, Tokyo (JP); Yumiko Fukikoshi, Tokyo (JP)

(73) Assignee: CIRCULUS INC., Tokyo (JP)

( * ) Notice: Subject to any disclaimer, the term of this patent is extended or adjusted under 35 U.S.C. 154(b) by 949 days.

(21) Appl. No.: 17/256,568

(22) PCT Filed: Jun. 27, 2019

(86) PCT No.: PCT/JP2019/025697
§ 371 (c)(1),
(2) Date: Dec. 28, 2020

(87) PCT Pub. No.: WO2020/004581
PCT Pub. Date: Jan. 2, 2020

(65) Prior Publication Data
US 2021/0369950 A1  Dec. 2, 2021

(30) Foreign Application Priority Data

Jun. 29, 2018  (JP) ................................ 2018-124918

(51) Int. Cl.
*A61M 5/145* (2006.01)
*A61M 5/168* (2006.01)
*A61M 5/172* (2006.01)

(52) U.S. Cl.
CPC ...... *A61M 5/1452* (2013.01); *A61M 5/16881* (2013.01); *A61M 5/172* (2013.01); *A61M 2205/3337* (2013.01)

(58) Field of Classification Search
CPC ............ A61M 5/1452; A61M 5/16881; A61M 5/172; A61M 2205/3337; A61M 5/16827;
(Continued)

(56) References Cited

U.S. PATENT DOCUMENTS 4,089,506 A * 5/1978 Blake .................. F16K 3/28
251/327
5,411,482 A * 5/1995 Campbell ............. A61M 5/148
604/153
(Continued)

FOREIGN PATENT DOCUMENTS

JP   2004065736 A   3/2004
JP   2011-167272 A  9/2011
(Continued)

OTHER PUBLICATIONS

International Preliminary Report on Patentability (Chapter I) and Written Opinion of the International Searching Authority; PCT/JP2019/025697; mailed on Dec. 29, 2020; with English language translation.

(Continued)

*Primary Examiner* — Courtney B Fredrickson
*Assistant Examiner* — Kayla M. Turkowski
(74) *Attorney, Agent, or Firm* — Studebaker Brackett PLLC

(57) ABSTRACT

In a chemical liquid injection conduit, there is a need to prevent a backflow of body fluid of a subject reaching the inside of a common conduit portion. This is solved by the chemical liquid injecting apparatus that includes: a common conduit portion that flows a chemical liquid from a chemical liquid injector to a replaceable conduit portion; a control device that controls the chemical liquid injector; and a flow blocking unit that is arranged inside the replaceable conduit or in a conduit of a boundary portion between the replaceable conduit and the common conduit portion, and by receiving a command from the control device, is switchable between an open state allowing a flow of the chemical liquid and a closed state blocking a flow of the chemical liquid.

9 Claims, 11 Drawing Sheets

(58) Field of Classification Search
CPC ...... A61M 5/16854; A61M 2005/1406; A61M 2205/3351; A61M 39/281; A61M 39/24; A47K 5/1208; A47K 5/1204; A47K 5/1209; Y10T 137/2207
See application file for complete search history.

(56) References Cited

U.S. PATENT DOCUMENTS

| | | | | |
|---|---|---|---|---|
| 9,782,194 | B2* | 10/2017 | Matsuzaki | A61B 17/3203 |
| 9,943,680 | B2* | 4/2018 | Strobl | A61M 5/007 |
| 2004/0089594 | A1* | 5/2004 | Collins | A61M 1/3437 |
| | | | | 210/197 |
| 2006/0167415 | A1 | 7/2006 | Nemoto | |
| 2009/0093774 | A1* | 4/2009 | Wang | A61M 5/16881 |
| | | | | 604/247 |
| 2011/0178468 | A1 | 7/2011 | Lee | |
| 2014/0127037 | A1* | 5/2014 | Uchida | F04B 7/0076 |
| | | | | 417/279 |
| 2018/0140770 | A1* | 5/2018 | Hetchler | A61M 5/16831 |
| 2018/0140778 | A1* | 5/2018 | Udagawa | A61M 5/20 |
| 2018/0274533 | A1* | 9/2018 | Ambrosina | F04B 23/10 |

FOREIGN PATENT DOCUMENTS

| | | |
|---|---|---|
| WO | 2013008929 A1 | 1/2013 |
| WO | 2014104338 A1 | 7/2014 |

OTHER PUBLICATIONS

International Search Report issued in PCT/JP2019/025697; mailed Sep. 24, 2019.
An Office Action; "Notice of Reasons for Refusal," mailed by the Japanese Patent Office on May 27, 2025, which corresponds to Japanese Patent Application No. 2024-147595 and is related to U.S. Appl. No. 17/256,568; with English language translation.

* cited by examiner

CHEMICAL LIQUID INJECTING APPARATUS

TECHNICAL FIELD

The present invention relates to a chemical liquid injecting apparatus that blocks a flow path for injecting a chemical liquid into a subject.

BACKGROUND ART

Examples of image diagnostic scanning methods for medical application include a method that uses a computed tomography apparatus (CT apparatus), a method that uses a nuclear magnetic resonance apparatus (MRI apparatus), and a method that uses an angiographic imaging apparatus (angiography). Generally, when using these kinds of apparatuses, a two-component liquid (hereinafter, referred to as "chemical liquid") including a contrast medium and a physiological saline is injected by a predetermined process into a subject such as a patient. The chemical liquid injecting apparatus of the present invention is an apparatus that injects a chemical liquid into a subject in these kinds of diagnostic imaging apparatuses.

The contrast medium is injected into a subject from, for example, in the case of an apparatus disclosed in PTL 1, a syringe mounted in a chemical liquid injecting apparatus. In PTL 1, it is disclosed that chemical liquids from syringes of two systems containing a contrast medium and a physiological saline are injected into a subject while switching between the syringes at a predetermined timing.

Further, in PTL 2, a clamping mechanism that crushes a flexible tube to block off a predetermined location of a flow path that supplies a chemical liquid is disclosed. The clamping mechanism crushes the flexible tube with a clamp member to enable injection of a predetermined chemical liquid according to a predetermined procedure.

A chemical liquid injection conduit inside such kind of chemical liquid injecting apparatus has a replaceable conduit portion replaced for each subject due to hygiene requirements, and a common conduit portion used commonly for a plurality of subjects due to cost factors. The replaceable conduit portion and the common conduit portion are detachably connectable by a joint at a predetermined location. The former is a conduit constituted by a piercing member, such as a needle or a catheter, to be introduced into a blood vessel of a subject, and a tube disposed on the subject side and connected to the piercing member, and is a conduit necessary to be replaced at short cycles for each subject because of hygiene requirements. On the other hand, the latter is a conduit constituted by a tube that is disposed on the side of a high precision instrument such as a chemical liquid injector and that includes a syringe and a chemical liquid source or the like, and is a conduit suited for replacement at long cycles from the viewpoint of cost.

With regard to the inside of a chemical liquid injection conduit, there is a possibility that body fluid such as blood of the subject downstream of the supply path of the chemical liquid will flow back to upstream of the chemical liquid conduit. If the body fluid of a given subject flow backs past the replaceable conduit portion as far as the common conduit portion, when injecting a chemical liquid into the next subject it will be necessary to also replace the common conduit portion, instead of needing to replace only the replaceable conduit portion. Consequently, irrespective of the fact that the purpose of providing the common conduit portion is that the common conduit portion is to be replaced at long cycles, the result is that it becomes necessary to replace the common conduit portion at short cycles, and hence the purpose of providing the common conduit portion is lost. Therefore, there is a need to first and foremost restrict a backflow of body fluid of a subject to within the replaceable conduit portion, and to prevent a backflow of body fluid of the subject from reaching the common conduit portion.

CITATION LIST

Patent Literature

PTL 1: Japanese Patent Application Laid-Open No. 2004-065736
PTL 2: International Patent Publication No. WO2014/104338

SUMMARY OF INVENTION

Technical Problem

In general, because the flow of an incompressible fluid such as a liquid flows from a side on which pressure is high to a side on which pressure is low, a backflow can be prevented by keeping the pressure on the upstream side of a conduit higher than the pressure on the downstream side. Therefore, in a chemical liquid injection circuit also, there is a need to always keep the pressure on the upstream side of a supply path of chemical liquid higher than the pressure on the downstream side.

Solution to Problem

The problem is solved by a chemical liquid injecting apparatus for injecting a chemical liquid into a subject, including: a chemical liquid injector including a chemical liquid source of the chemical liquid that has an opening, and chemical liquid supply unit for performing discharge of the chemical liquid from the opening; a replaceable conduit portion that supplies the chemical liquid to a blood vessel of the subject; a common conduit portion that is connected to the opening of the chemical liquid source and that flows the chemical liquid from the chemical liquid injector to the replaceable conduit portion; a control device that is electrically connected by wire or wirelessly to the chemical liquid supply unit, and that controls driving of the chemical liquid supply unit; and a flow blocking unit that is arranged in a conduit within the replaceable conduit portion or in a conduit of a boundary portion between the replaceable conduit portion and the common conduit portion and that is switchable between an open state and a closed state by the chemical liquid supply unit receiving a command from the control device, the chemical liquid supply unit electrically connected by wire or wirelessly to the control device, the open state allowing a flow of the chemical liquid, the closed state blocking a flow of the chemical liquid, wherein, upon a first predetermined time period elapsing after supply of a chemical liquid from the chemical liquid injector is started, the control device sends the command to the flow blocking unit to place the flow blocking unit in the open state allowing a flow of the chemical liquid, and upon a second predetermined time period elapsing after supply of a chemical liquid from the chemical liquid injector is completed, the control device sends the command to the flow blocking unit to place the flow blocking unit in the closed state blocking a flow of the chemical liquid.

The problem is solved by a chemical liquid injecting apparatus for injecting a chemical liquid into a subject, including: a chemical liquid injector including a chemical liquid source of the chemical liquid that has an opening, and chemical liquid supply unit for performing discharge of the chemical liquid from the opening; a replaceable conduit portion that supplies the chemical liquid to a blood vessel of the subject; a common conduit portion that is connected to the opening of the chemical liquid source and that flows the chemical liquid from the chemical liquid injector to the replaceable conduit portion; a control device that is electrically connected by wire or wirelessly to the chemical liquid supply unit, and that controls driving of the chemical liquid supply unit; and a flow blocking unit that is arranged in a conduit within the replaceable conduit portion or in a conduit of a boundary portion between the replaceable conduit portion and the common conduit portion and that is switchable between an open state and a closed state by the chemical liquid supply unit receiving a command from the control device, the chemical liquid supply unit electrically connected by wire or wirelessly to the control device, the open state allowing a flow of the chemical liquid, the closed state blocking a flow of the chemical liquid, wherein, upon a pressure inside the common conduit portion reaching a predetermined pressure higher than an intravascular pressure of the subject, the control device sends the command to the flow blocking unit to place the flow blocking unit in the open state allowing a flow of the chemical liquid, and upon the pressure inside the common conduit portion becoming lower than the predetermined pressure, the control device sends the command to the flow blocking unit to place the flow blocking unit in the closed state blocking a flow of the chemical liquid.

Advantageous Effects of Invention

By this means, in a chemical liquid injection conduit, it is possible to prevent a backflow of body fluid of a subject that passes beyond a replaceable conduit portion and reaches the inside of a common conduit portion.

DESCRIPTION OF EMBODIMENTS

Figure 1:
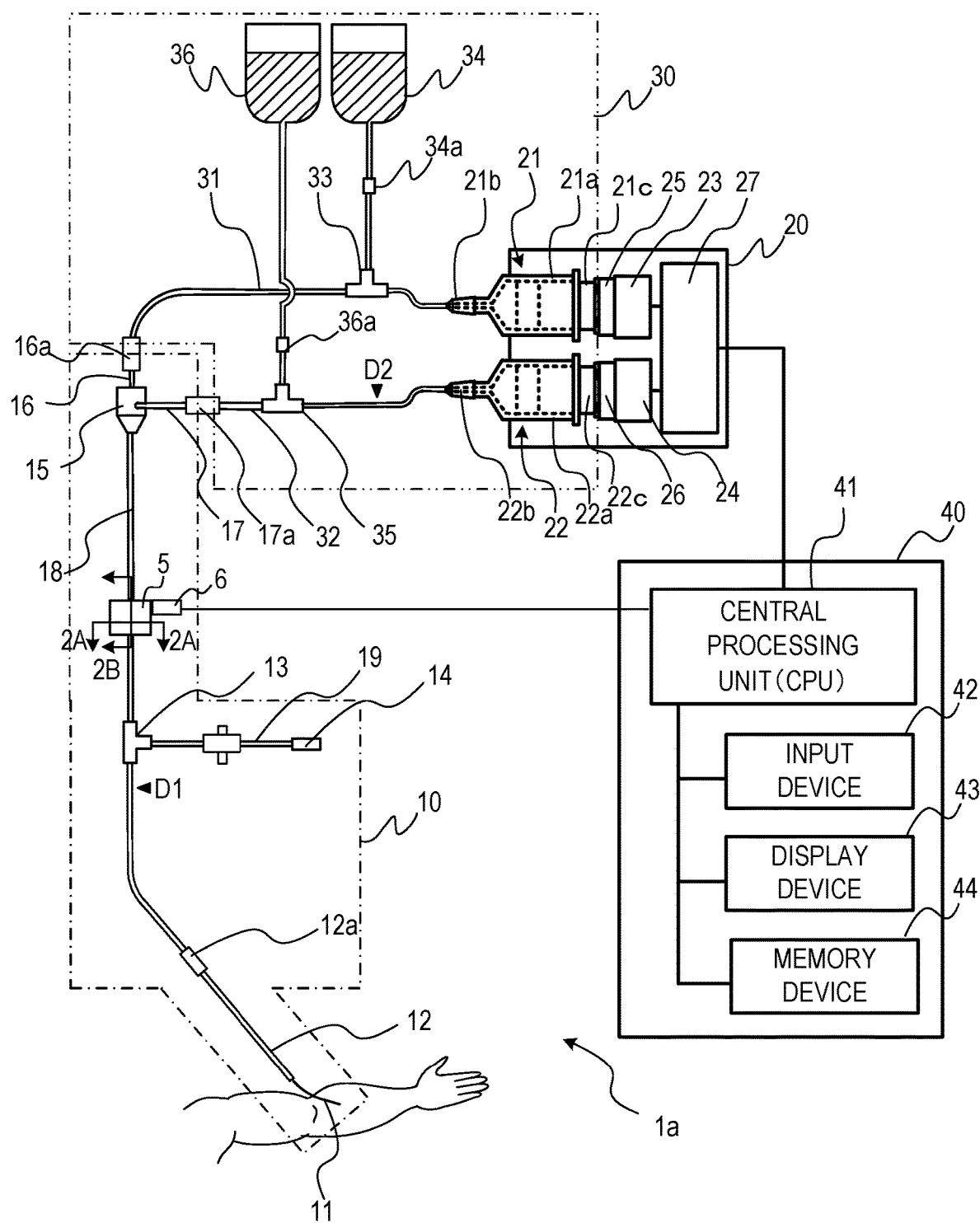
FIG. 1 is a schematic diagram of a chemical liquid injecting apparatus of Example 1 of one embodiment of the present invention.

Hereunder, embodiments of the present invention are described. The dimensions, materials, shapes and relative positions of components and the like are freely determined and can be changed according to the configuration of an apparatus to which the present invention is applied or to various conditions. Also, unless otherwise specified, the scope of the present invention is not limited to the embodiments that are specifically described below.

The present invention is a chemical liquid injecting apparatus for injecting a chemical liquid into a subject. The chemical liquid injecting apparatus includes a chemical liquid injector, a replaceable conduit portion, a common conduit portion, a control device, and a flow blocking unit. The chemical liquid injector is a chemical liquid source that has an opening and that holds a chemical liquid therein, and performs discharge of the chemical liquid from the opening by means of chemical liquid supply unit. The replaceable conduit portion is, for example, a tube-like conduit and is connected to a piercing member such as a needle or a catheter to be introduced into a blood vessel of a subject, and a chemical liquid flows through the inside of the tube. This portion is used based on the premise that the portion will be replaced at short cycles to be replaced for each patient. The common conduit portion is connected between the chemical liquid injector and the replaceable conduit portion. It is taken as a premise that the common conduit portion will not be replaced for each patient and will be replaced at long cycles. The common conduit portion is connected to the opening of the chemical liquid source, and causes the chemical liquid to flow from the chemical liquid injector to the replaceable conduit portion, and for example is a tube-like conduit. The control device is electrically connected by wire or wirelessly to the chemical liquid supply unit, and sends a command to the chemical liquid supply unit to control driving of the chemical liquid supply unit.

The flow blocking unit is arranged in a conduit within the replaceable conduit portion or in a conduit at a boundary portion between the replaceable conduit portion and the common conduit portion. The flow blocking unit is electrically connected by wire or wirelessly to the control device. The flow blocking unit is switchable between an open state allowing a flow of chemical liquid and a closed state blocking a flow of chemical liquid, by the chemical liquid supply unit receiving a command from the control device. Further, upon the pressure inside the common conduit portion reaching a predetermined pressure higher than the intravascular pressure of the subject, the control device sends a command to the flow blocking unit to place the flow blocking unit in an open state to allow a flow of the chemical liquid. On the other hand, upon the pressure inside the common conduit portion becoming lower than the predetermined pressure higher than the intravascular pressure of the subject, the control device sends a command to the flow blocking unit to place the flow blocking unit in a closed state blocking a flow of the chemical liquid.

The types of chemical liquid injector that can be applied as the chemical liquid injector include a type that pressurizes a chemical liquid from the upstream side, and a type that depressurizes the downstream side to pump the chemical liquid. The types that can be applied as a type that pressurizes a chemical liquid from the upstream side include a syringe type, a type in which a pressurizing apparatus that pressurizes the inside of a container holding the chemical liquid to perform discharge of the chemical liquid is used as chemical liquid supply unit, and a type in which a pressurizing apparatus that pressurizes the inside of a container holding the chemical liquid by pressing the outside of the container to perform discharge of the chemical liquid is used as chemical liquid supply unit. The syringe type can be applied as a type in which an outer cylinder that holds a chemical liquid, and a drive motor that imparts a pressing force to press the chemical liquid with a piston inserted into the outer cylinder are used as chemical liquid supply unit. As the type that depressurizes the downstream side to pump a chemical liquid, it is possible to use a type that presses at least two locations of the conduit of the common conduit portion by means of pressing portions to thereby create a section at which the chemical liquid is contained between the narrowed portions of the conduit, and causes the chemical liquid inside the aforementioned section to move while being pushed from the side of the chemical liquid source that is the upstream side to the side of the subject that is the downstream side by chemical liquid supply unit.

As the flow blocking unit, it is possible to use a type that blocks a flow of a chemical liquid by means of a member that sandwiches a conduit inside the replaceable conduit portion or at a boundary portion between the replaceable conduit portion and the common conduit portion, and a type that uses a shut-off valve arranged within the conduit.

As a method for determining a predetermined pressure for shutting off the shut-off valve, it is conceivable to directly measure the pressure inside the chemical liquid injector or the pressure inside a conduit in at least one of the replaceable conduit portion and the common conduit portion using a pressure sensor. Further, since it is inconvenient with respect to the use of the chemical liquid injecting apparatus to have to go to the trouble of disposing a pressure sensor to directly measure the pressure when injecting a chemical liquid, a technique that indirectly estimates the pressure within a conduit can also be adopted. For example, in the type that use a syringe, it is possible to determine a predetermined pressure according to the value of an electrical signal input to the drive motor when causing the drive motor to drive, and it is possible to also provide a pressing force detecting element between the drive motor and the piston and to determine a predetermined pressure according to an electrical signal that the pressing force detecting element outputs.

Next, specific examples with respect to this embodiment are described hereunder.

Example 1

Hereunder, Example 1 of the invention of the present application is first described referring to FIG. 1 to FIG. 4. Example 1 is, among the types in the embodiment described above, a type that adopts a syringe. FIG. 1 illustrates an overall configuration diagram of a chemical liquid injecting apparatus $1a$ of Example 1. The chemical liquid injecting apparatus $1a$ includes a replaceable conduit portion 10, a chemical liquid injector 20, a common conduit portion 30 and a control device 40. The replaceable conduit portion 10 and the common conduit portion 30 form a chemical liquid injection conduit. The replaceable conduit portion 10 is replaced for each subject, while on the other hand the common conduit portion 30 is used commonly for a plurality of subjects. The replaceable conduit portion 10 and the common conduit portion 30 are differentiated by defining the replaceable conduit portion 10 as a region of the conduit at which there is a possibility that body fluid of a subject will flow back, and defining the common conduit portion 30 as a region to which body fluid of a subject does not flow back. The chemical liquid injecting apparatus $1a$ is configured so that a chemical liquid supplied from the chemical liquid injector 20 initially flows into the common conduit portion 30 forming the chemical liquid injection conduit, and flows from the common conduit portion 30 to the replaceable conduit portion 10.

The replaceable conduit portion 10 is a line that, in the chemical liquid injection conduit, is on the subject side that is downstream of the common conduit portion 30. The replaceable conduit portion 10 has, at a downstream end thereof, an injection tube 12 which is connectable to a piercing member 11 such as a needle or a catheter pierced or introduced into a blood vessel of the subject to inject a chemical liquid into the subject, and which has a tubular interior through which the chemical liquid flows. On the other hand, the upstream end of the replaceable conduit portion 10 bifurcates into a first supply tube 16 and a second supply tube 17. The first supply tube 16 and the second supply tube 17 are each connected to an input side of a mixing device 15. A mixture supply tube 18 is connected to an output side of the mixing device 15. A first connection joint 16a and a second connection joint 17a are connected to the first supply tube 16 and the second supply tube 17, respectively, on the opposite side to the side on which the mixing device 15 is connected. A chemical liquid from the first supply tube 16 and a chemical liquid from the second supply tube 17 are mixed by the mixing device 15, and flow into the mixture supply tube 18. The first supply tube 16, the second supply tube 17 and the mixture supply tube 18 are each made of a flexible tube. The injection tube 12 can be connected to the mixture supply tube 18 by a connector 12a. A T-shaped connector can also be used for connecting the tubes instead of using the mixing device 15.

The replaceable conduit portion 10 has a T-shaped connector 13 in the mixture supply tube 18, and by means of the T-shaped connector 13, branches from the mixture supply tube 18 as a monitor line 19 for detecting the blood pressure or pulse of the subject. A port to which a pressure detecting element 14 is connectable is arranged at the tip of the monitor line 19, and the pressure detecting element 14 detects the blood pressure or pulse of the subject.

The chemical liquid injector 20 includes a chemical liquid source of a chemical liquid which has an opening, and chemical liquid supply unit which pressurizes the chemical liquid to discharge the chemical liquid from the opening. The chemical liquid injector 20 is typically, for example, a syringe filled with a chemical liquid. In a case where a syringe is adopted as the chemical liquid injector 20, a syringe having an outer cylinder that can be filled with a chemical liquid as the chemical liquid source, and a piston which is inserted into the outer cylinder and which is capable of moving relative to the outer cylinder and pressing the chemical liquid to push the chemical liquid out from opening can be adopted as the chemical liquid injector 20. In this case, a drive motor that imparts a driving force that presses the piston can be adopted as the chemical liquid supply unit. A representative example of syringes used in the case of injecting two chemical liquids into a subject is described hereunder. The chemical liquid injector 20 includes a first syringe 21 for supplying a contrast medium as a first chemical liquid, and a second syringe 22 for supplying a physiological saline as a second chemical liquid. The first syringe 21 has an outer cylinder 21a, and has an opening 21b for sucking in or discharging the first chemical liquid in the tip of the outer cylinder 21a, and also has a piston 21c inserted into an opening on the opposite side to the opening 21b. The second syringe 22 has an outer cylinder 22a, and has an opening 22b for sucking in or discharging the second chemical liquid in the tip of the outer cylinder 22a, and also has a piston 22c inserted into an opening on the opposite side to the opening 22b.

The chemical liquid injector 20 includes a drive motor that imparts a driving force that invokes movement of the piston of the syringe, as chemical liquid supply unit. In the present example, the chemical liquid injector 20 has a first motor 23 and a second motor 24 as drive motors. To allow the first syringe 21 and the second syringe 22 to be replaceable, the first motor 23 and the piston 21c are not directly connected, and the second motor 24 and the piston 22c are not directly connected, and instead the first motor 23 is attached through a pressing member 25 to the piston 21c of the first syringe 21, and the second motor 24 is attached through a pressing member 26 to the piston 22c of the second syringe 22. The piston 21c of the first syringe 21 and the piston 22c of the second syringe 22 are pushed via the pressing member 25 and the pressing member 26 by the first motor 23 and the second motor 24, so that the piston 21c and the piston 22c move forward or move backward, respectively. When the piston 21c of the first syringe 21 moves backward, the first chemical liquid is sucked into the outer cylinder 21a, and when the piston 21c of the first syringe 21 moves forward, the first chemical liquid is discharged from inside the outer cylinder 21a. When the piston 22c of the second syringe 22 moves backward, the second chemical liquid is sucked into the outer cylinder 22a, and when the piston 22c of the second syringe 22 moves forward, the second chemical liquid is discharged from inside the outer cylinder 22a.

The first motor 23 and the second motor 24 are, for example, typically direct current motors (DC motors). The chemical liquid injector 20 has a control circuit 27, and controls the first motor 23 and the second motor 24 serving as drive motors by pulse width modulation control (PWM control). By controlling the pulse width of a constant voltage pulse as well as the on-off duty cycle of the pulse, the rotation angle and rotational speed of each drive motor can be controlled by an amount of electric power determined based on the pulse width and voltage on-off duty cycle being applied to the respective drive motors. The first motor 23 and the second motor 24 each perform predetermined rotation according to the amount of electric power applied, and the advancing speed, advancing amount, retracting speed and retraction amount of the pressing member 25 and the pressing member 26 are determined by the rotation angle and rotational speed of the first motor 23 and the second motor 24. By this means, the piston 21c of the first syringe 21 and the piston 22c of the second syringe 22 move relative to the outer cylinder 21a and the outer cylinder 22a, respectively.

The common conduit portion 30 lies upstream of the replaceable conduit portion 10 in the chemical liquid injection conduit. The common conduit portion 30 includes a first chemical liquid line 31 through which a contrast medium as the first chemical liquid flows, and a second chemical liquid line 32 through which a physiological saline as the second chemical liquid flows. The downstream side end of the first chemical liquid line 31 is detachably connected to the first connection joint 16a of the replaceable conduit portion 10, and is fluidly connectable to the first supply tube 16. On the other hand, the downstream side end of the second chemical liquid line 32 is detachably connected to the second connection joint 17a of the replaceable conduit portion 10, and is fluidly connectable to the second supply tube 17. The first connection joint 16a and the second connection joint 17a are means for joining together or separating the replaceable conduit portion 10 and the common conduit portion 30.

The conduit of the first chemical liquid line 31 branches at a position partway along the first chemical liquid line 31 by means of a T-shaped connector 33, with one of the branched conduits connected to the opening 21b of the first syringe 21, and the other of the branched conduits connected through a first chemical liquid valve 34a to a first chemical liquid bag 34 in which the first chemical liquid is stored. If the first chemical liquid valve 34a is closed, the first chemical liquid bag 34 and the first chemical liquid line 31 are isolated from each other, and if the first chemical liquid valve 34a is opened, the first chemical liquid bag 34 and the first chemical liquid line 31 communicate. Similarly, the conduit of the second chemical liquid line 32 branches at a position partway along the second chemical liquid line 32 by means of a T-shaped connector 35, with one of the branched conduits connected to the opening 22b of the second syringe 22, and the other of the branched conduits connected through a second chemical liquid valve 36a to a second chemical liquid bag 36 in which the second chemical liquid is stored. If the second chemical liquid valve 36a is closed, the second chemical liquid bag 36 and the second chemical liquid line 32 are isolated from each other, and if the second chemical liquid valve 36a is opened, the second chemical liquid bag 36 and the second chemical liquid line 32 communicate. A configuration can be adopted in which the first chemical liquid valve 34a and the second chemical liquid valve 36a are not open/close valves, but instead are one-way valves that allow only a flow from the first chemical liquid bag 34 to the first chemical liquid line 31 in a state in which a flow from the first chemical liquid line 31 to the first chemical liquid bag 34 is prevented, and only a flow from the second chemical liquid bag 36 to the second chemical liquid line 32 in a state in which a flow from the second chemical liquid line 32 to the second chemical liquid bag 36 is prevented, respectively. In this case, the first chemical liquid bag 34 continuously communicates with the first chemical liquid line 31 in a state in which only a flow from the first chemical liquid bag 34 to the first chemical liquid line 31 is allowed, and the second chemical liquid bag 36 continuously communicates with the second chemical liquid line 32 in a state in which only a flow from the second chemical liquid bag 36 to the second chemical liquid line 32 is allowed. By closing off the downstream side of the first chemical liquid line 31 in which the T-shaped connector 33 of the portion that branches to the first chemical liquid bag 34 is located, and the downstream side of the second chemical liquid line 32 in which the T-shaped connector 35 of the portion that branches to the second chemical liquid bag 36 is located, that is, the first supply tube 16 and the second supply tube 17 or the mixture supply tube 18, a conduit in which the first chemical liquid flows from the first chemical liquid bag 34 to the first syringe 21, and a conduit in which the second chemical liquid flows from the second chemical liquid bag 36 to the second syringe 22 are formed.

The control device 40 includes a central processing unit (CPU) 41, an input device 42, a display device 43, and a memory device 44. Input of required information is enabled by the input device 42, and it is possible for a user to input required information as displayed on the display device 43. Information input is stored in the memory device 44. The control device 40 is electrically connected by wire or wirelessly to the chemical liquid injector 20. The central processing unit (CPU) 41 issues commands to the control circuit 27 of the chemical liquid injector 20 in accordance with a program stored in the memory device 44 and information stored in the memory device. Although in the present example, a configuration is illustrated in which the chemical liquid injector 20 has the control circuit 27, the chemical liquid injector 20 need not have the control circuit 27. In such a case, in the control device 40, the central processing unit (CPU) 41 has the function of the control circuit 27, and the central processing unit (CPU) 41 may control the amount of electric power applied to the first motor 23 and the second motor 24.

A flow blocking unit 5 is mounted in the mixture supply tube 18. Although in the present example a case is illustrated in which the flow blocking unit 5 is mounted in the mixture supply tube 18 within the replaceable conduit portion 10, it suffices to arrange the flow blocking unit 5 within the replaceable conduit portion 10 or within a boundary portion between the replaceable conduit portion 10 and the common conduit portion 30, that is, inside the replaceable conduit portion 10 until the common conduit portion 30. For example, the flow blocking unit 5 may be arranged at the first connection joint 16a and the second connection joint 17a which serve as a boundary portion between the replaceable conduit portion 10 and the common conduit portion 30. The region downstream from the flow blocking unit 5 is, as the replaceable conduit portion 10, a region of the conduit at which there is a possibility that body fluid of a subject will flow back, and the common conduit portion 30 is located upstream from the flow blocking unit 5 as a region which body fluid of a subject does not flow back to. That is, although FIG. 1 illustrates a case where the flow blocking unit 5 is located downstream of the mixing device 15 as one example, the positional relationship between the flow blocking unit 5 and the mixing device 15 may be any positional relationship. The flow blocking unit 5 is capable of switching, by means of a driving force of driving means 6, between an open state allowing a flow of a chemical liquid inside the mixture supply tube 18 before and after the mixture supply tube 18, and a closed state blocking a flow of a chemical liquid inside the mixture supply tube 18 before and after the mixture supply tube 18. Any form may be adopted as the flow blocking unit 5 as long as the flow blocking unit 5 is capable of switching between an open state allowing a flow of a chemical liquid inside the mixture supply tube 18 before and after the mixture supply tube 18, and a closed state blocking a flow of a chemical liquid inside the mixture supply tube 18 before and after the mixture supply tube 18. When the flow blocking unit 5 is in a closed state, the conduit that is upstream of the flow blocking unit 5 and a flow in the conduit downstream of the flow blocking unit 5 are isolated from each other by the flow blocking unit 5, and the flow on the downstream side from the flow blocking unit 5 does not flow back to upstream of the flow blocking unit 5. The driving means 6 is electrically connected by wire or wirelessly to the control device 40, and it is possible for the control device 40 to place the flow blocking unit 5 in the open state or the closed state by a command from the central processing unit (CPU) 41. The flow blocking unit 5 can be provided, for example, in the following form.

Figure 2A:
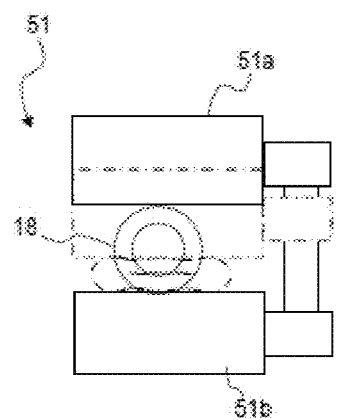
FIG. 2A is a view illustrating one example of a flow blocking unit of the present invention.

For example, a flow blocking device 51 having a form in which the mixture supply tube 18 is placed between two block members 51a and 51b arranged opposing each other can be adopted as the flow blocking unit 5. FIG. 2A illustrates a cross-sectional drawing of an example of the blocking device 51. The flow blocking device 51 can switch between an open state (solid line) in which the block members 51a and 51b are located at positions which are separated from each other by a distance greater than a distance corresponding to the diameter of the mixture supply tube 18 and allow a flow inside the mixture supply tube 18, and a closed state (alternate long and short dash line) in which the block members 51a and 51b are closer to each other than a distance corresponding to the diameter of the mixture supply tube 18 and sandwich the mixture supply tube 18 and stop a flow inside the mixture supply tube 18. The block members 51a and 51b are movable between a distance at which the flow blocking device 51 enters the open state (solid line), and a distance at which the flow blocking device 51 enters the closed state (alternate long and short dash line) by the driving means 6. Various forms of the driving means 6 can be used as the driving means 6 that supplies a driving force to the block members 51a and 51b, as long as the driving means 6 can move the block members 51a and 51b so that it is possible to block a chemical liquid in a short period of time. For example, it is possible to use means that imparts a driving force by an electromagnetic force, or means that imparts a driving force by a mechanical force such as fluid pressure or a motor. The flow blocking unit 5 can be provided as an integrated apparatus with the driving means 6, or can be provided as a separate apparatus from the driving means 6. In this way, it is possible to stop a flow of chemical liquid into the mixture supply tube 18 before and after the mixture supply tube 18. A plurality of the flow blocking devices 51 may also be arranged on the mixture supply tube 18, along the extending direction of the mixture supply tube 18. In such a case, when placing the flow blocking devices 51 in an open state to inject a chemical liquid into a subject, a sequence may be adopted to open the flow blocking units 5 in order from the chemical liquid source side that corresponds to the upstream side, toward the subject side that corresponds to the downstream side. Further, when placing the flow blocking devices 51 in a closed state after injecting the chemical liquid into the subject, a sequence may be adopted to close the flow blocking units 5 in order from the subject side that corresponds to the downstream side toward the chemical liquid source side that corresponds to the upstream side.

Figure 2B:
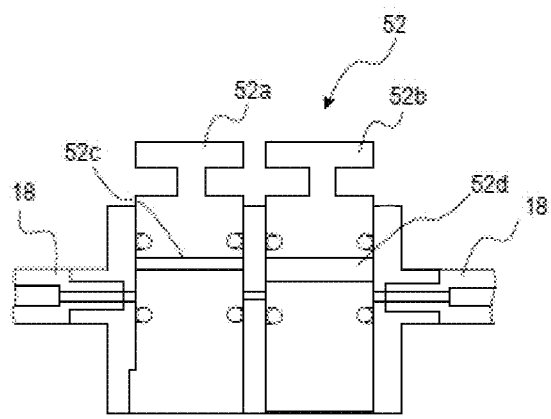
FIG. 2B is a view illustrating another example of a flow blocking unit of the present invention.

Further, for example, a shut-off valve 52 arranged along the flow of the mixture supply tube 18 can be adopted as the flow blocking unit 5. FIG. 2B illustrates a cross-sectional diagram of an example of the shut-off valve 52 in a closed state. The shut-off valve 52 includes, for example, a first piston 52a and a second piston 52b. The first piston 52a and the second piston 52b are received and supported by a valve housing to be movable in a perpendicular direction to the direction of the flow of the mixture supply tube 18. A flow path 52c that extends along the flow direction of the mixture supply tube 18 is formed in the first piston 52a, and a flow path 52d that extends along the flow direction of the mixture supply tube 18 is formed in the second piston 52b. The shut-off valve 52 is arranged along the flow of the mixture supply tube 18 so that the first piston 52a side is the downstream side of the chemical liquid injection conduit, that is, the side of the subject, and the second piston 52b side is the upstream side of the chemical liquid injection conduit, that is, the chemical liquid side. The cross-sectional area of the flow path 52c is smaller than the cross-sectional area of the flow path 52d. When the first piston 52a and the second piston 52b are at predetermined positions such that the flow path 52c, the flow path 52d and the flow path of the mixture supply tube 18 are aligned in a straight line, the state is an open state (not illustrated) which allows a flow inside the mixture supply tube 18. Further, a state when the first piston 52a and the second piston 52b move in a direction perpendicular to the flow path of the mixture supply tube 18 and the flow path 52c, the flow path 52d and the flow path of the mixture supply tube 18 are not in a straight line is a closed state (state illustrated in FIG. 2B). The first piston 52a and the second piston 52b are configured to be moveable between the open state and the closed state by the driving means 6. Various forms of driving means can be used as the driving means 6 for supplying a driving force to the first piston 52a and the second piston 52b, as long as the driving means 6 can move the first piston 52a and the second piston 52b so that it is possible to block a chemical liquid in a short period of time. For example, it is possible to use means that electromagnetically imparts a driving force, or means that mechanically imparts a driving force using fluid pressure or a mechanism or the like. The flow blocking unit 5 can be provided as an integrated apparatus with the driving means 6, or can be provided as a separate apparatus from the driving means 6. Thus, even when the shut-off valve 52 driven by the driving means 6 is used, it is possible to stop a flow of chemical liquid in the mixture supply tube 18 before and after the mixture supply tube 18. Although an example is described here in which two pistons, namely, the first piston 52a and the second piston 52b, are arranged as the shut-off valve 52, a shut-off valve in which one or more pistons are arranged can also be applied. Further, in a case where two or more pistons are arranged, a plurality of pistons is arranged on the mixture supply tube 18, along the extending direction of the mixture supply tube 18. In such a case, when placing the pistons in an open state to inject a chemical liquid into a subject, a sequence may be adopted to open the pistons in order from the chemical liquid source side that corresponds to the upstream side, toward the subject side that corresponds to the downstream side. Further, when placing the pistons in a closed state after injecting the chemical liquid into the subject, a sequence may be adopted to close the pistons in order from the subject side that corresponds to the downstream side, toward the chemical liquid source side that corresponds to the upstream side.

Figure 3A:
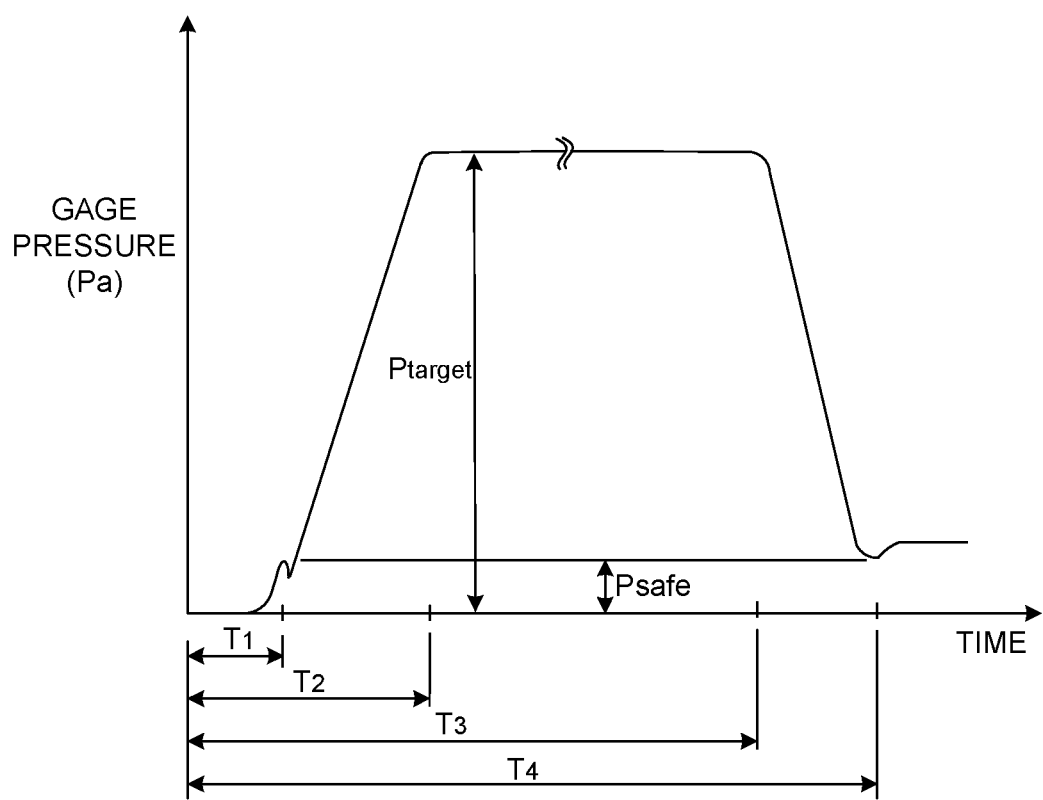
FIG. 3A is a schematic diagram illustrating a history of transitions in the pressure inside a chemical liquid injection conduit of the present invention.
Figure 3B:
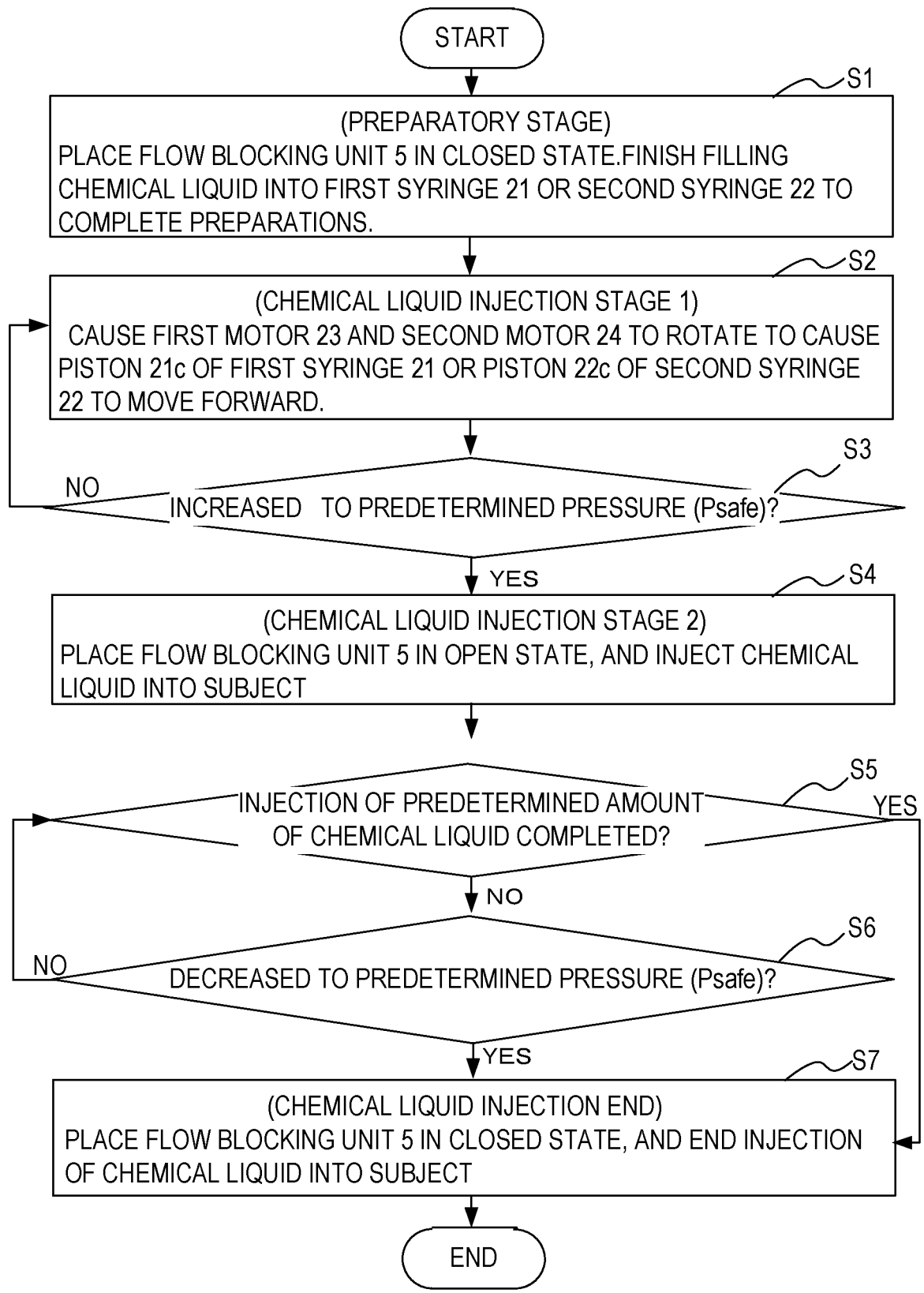
FIG. 3B is a view illustrating a flowchart of a chemical liquid injecting process of the chemical liquid injecting apparatus of the present invention.

Next, the manner in which the flow blocking unit 5 is driven by the driving means 6 under control of the control device 40 so that a backflow of body fluid of a subject within the replaceable conduit portion 10 is prevented is described referring to FIG. 3A and FIG. 3B. Here, in order to simplify the description, it is assumed that a piercing member 11 has been pierced into a subject and filling of a chemical liquid into the first syringe 21 or the second syringe 22 has finished, and a chemical liquid injection sequence from a time point at which injection of the chemical liquid into the subject is started until injection of the chemical liquid is completed when the chemical liquid that was filled into the first syringe 21 or the second syringe 22 is all gone will be described. FIG. 3A illustrates a history of the pressure within a conduit at a location at an arbitrary position (D1 in FIG. 1) in the replaceable conduit portion 10 illustrated in FIG. 1. FIG. 3B is a view illustrating a flowchart of a chemical liquid injection process of the chemical liquid injecting apparatus of the present invention. With respect to FIG. 3A, although the pressure inside the conduit at a location at an arbitrary position (D2 in FIG. 1) in the common conduit portion 30 in FIG. 1 will differ as a pressure value when the flow path resistance inside the conduit is taken into consideration, the tendency of the changes in pressure will be approximately the same as in the pressure history illustrated in FIG. 3A. Further, the pressure inside the first syringe 21 or the second syringe 22 which are near to the arbitrary position (D2 in FIG. 1) in the common conduit portion 30 will also be approximately the same as the tendency of the pressure history illustrated in FIG. 3A. In FIG. 3A, the abscissa axis represents the passage of time, and the ordinate axis represents a gauge pressure for which the intravascular pressure of the subject is taken as a zero reference. First, in a preparatory stage, the flow blocking unit 5 is in a closed state, and in this stage, filling of a chemical liquid into the first syringe 21 or the second syringe 22 ends to complete the preparations. Here, the piercing member 11 is pierced into a subject (S1). The piercing member 11 can be pierced into the subject only in a case in which the flow blocking unit 5 is in the closed state.

From the state in which the flow blocking unit 5 is in a closed state, a command to rotate is issued to the first motor 23 and the second motor 24 from the central processing unit (CPU) 41 of the control device 40. Upon receiving the command, the first motor 23 and the second motor 24 cause the piston 21c of the first syringe 21 or the piston 22c of the second syringe 22 to move forward according to a predetermined sequence. As a result, the pressure inside the relevant chemical liquid injection conduit that includes the first syringe 21 or the second syringe 22 gradually increases (S2). It is determined whether or not the pressure inside the first syringe 21 or the second syringe 22 increased to a predetermined pressure (Psafe) that, when the intravascular pressure of the subject is taken as a zero reference, is higher than the intravascular pressure of the subject. If the predetermined pressure (Psafe) has not been reached, the piston 21c and the piston 22c are moved forward to gradually increase the pressure inside the relevant chemical liquid injection conduit that includes the first syringe 21 or the second syringe 22 (S3). For example, the predetermined pressure is of the order of several tens of kilopascals [kPa] (several pounds per square inch [psi]). Further, in particular, although the certainty that a backflow can be prevented will increase if the predetermined pressure is approximately 0.14 megapascals [MPa] (approximately 20 pounds per square inch [psi]), the predetermined pressure is not limited to this value. At this stage, the pressure in the common conduit portion 30 is higher than the pressure on the replaceable conduit portion 10 side. At a stage at which the pressure inside the chemical liquid injection conduit increased to the predetermined pressure (Psafe) (stage at which time period T1 elapsed), the control device 40 sends a command to the driving means 6 to place the flow blocking unit 5 which is in the closed state, in an open state (S4). From this state, body fluid of the subject does not flow back as far as the common conduit portion 30.

As a result of the flow blocking unit 5 changing to the open state, chemical liquid rapidly flows to the capacity of the downstream side of the flow blocking unit 5 to which the chemical liquid had not been introduced, and therefore although the pressure inside the chemical liquid injection conduit temporarily decreases in an extremely short time, immediately thereafter the pressure starts to increase. Subsequently, the rotational speed of each of the first motor 23 and the second motor 24 is lowered at a stage at which the pressure reaches a target injection pressure (Ptarget) (time point at which time period T2 elapsed), to thereby shift to constant-rate injection of the chemical liquid. During a period in which a sufficient amount of chemical liquid remains inside the first syringe 21 or the second syringe 22, the pressure inside the chemical liquid injection conduit exhibits a pressure history that changes almost at a constant rate according to the remaining chemical liquid amount (arbitrary time period until time point at which time period T3 is reached). At a stage at which the predetermined amount of chemical liquid that was initially scheduled has been injected, rotation of the first motor 23 and the second motor 24 is stopped and injection of the chemical liquid finishes (S5). By stopping rotation of the first motor 23 and the second motor 24, injection of the chemical liquid into the subject is left to a natural flow, and the pressure inside the chemical liquid injection conduit gradually decreases. In this case, a command is sent to the driving means 6 so that the flow blocking unit 5 enters a closed state blocking a flow of the chemical liquid (S7). A process (S5) for determining whether or not a predetermined amount of the chemical liquid has been injected need not be particularly provided, and it is determined that injection of the chemical liquid has been completed when a predetermined amount of the chemical liquid has been injected. When injection of the chemical liquid is completed upon a predetermined amount of chemical liquid being injected, the control device 40 sends a command to the driving means 6 so that the flow blocking unit 5 enters the closed state blocking the flow of the chemical liquid (S7). The process of injecting the chemical liquid is the same as this case in many cases. In this state, body fluid of the subject does not flow back to upstream of the flow blocking unit 5, that is, does not flow back at least to the most downstream part of the common conduit portion 30.

On the other hand, at a stage at which the predetermined amount of the chemical liquid has not yet been injected, injection of the chemical liquid is continued (S5). A situation in which the chemical liquid amount that was filled is insufficient or there is leakage of the chemical liquid or the like is an abnormal state in many cases, and when the amount of chemical liquid in the first syringe 21 or the second syringe 22 decreases, at a stage at which the predetermined amount of the chemical liquid has not yet been injected, the pressure inside the chemical liquid injection conduit including the first syringe 21 or the second syringe 22 exhibits a decreasing pressure history (from time point at which time period T3 elapses to time period T4). Upon the pressure inside the chemical liquid injection conduit becoming the predetermined pressure (Psafe) (time point at which time period T4 elapsed) (S6), the control device 40 sends a command to the driving means 6 to place the flow blocking unit 5 which is in an open state, in a closed state. At this stage, the pressure in the common conduit portion 30 is higher than on the replaceable conduit portion 10 side. In this state, body fluid of the subject does not flow back to upstream of the flow blocking unit 5, that is, does not flow back at least to the most downstream part of the common conduit portion 30. Detachment of the common conduit portion 30 from the replaceable conduit portion 10 is performed in this state. That is, the control device 40 sends a command to the driving means 6 so that the flow blocking unit 5 enters the open state allowing a flow of the chemical liquid upon the pressure inside the syringe reaching the predetermined pressure (Psafe) higher than the intravascular pressure of the subject, or so that the flow blocking unit 5 enters a closed state blocking a flow of the chemical liquid upon the pressure inside the syringe becoming lower than the predetermined pressure (Psafe) (S7).

The timing at which the control device 40 sends a command for performing a step that places the flow blocking unit 5 in an open state allowing a flow of the chemical liquid (S3), and sends a command for performing a step that places the flow blocking unit 5 in a closed state blocking a flow of the chemical liquid (S7) is a timing at which it is determined that the predetermined pressure (Psafe) was reached. In this regard, various methods can be adopted as the method for determining that the predetermined pressure (Psafe) was reached. For example, because the intravascular pressure of a human is at most approximately 130 millimeters of mercury (897 kilopascals [kPa]) (approximately 2.51 pounds per square inch [psi]), and an individual variation among respective subjects is at most 30 millimeters of mercury (4 kilopascals [kPa]) (approximately 0.57 pounds per square inch [psi]), the amount is small in comparison to the predetermined pressure (Psafe) of the order of several tens of kilopascals [kPa] (several pounds per square inch [psi]) higher. Therefore, the intravascular pressure of a human is uniquely assumed as a predetermined value, and without measuring the pressure at all, when it is estimated that the predetermined pressure (Psafe) of the order of several tens of kilopascals [kPa] (several pounds per square inch [psi]) higher than the assumed intravascular pressure is reached, the control device 40 sends a command to place the flow blocking unit 5 in an open state allowing a flow of the chemical liquid or in a closed state blocking a flow of the chemical liquid. For example, in the case of injecting the chemical liquid into a subject, the flow blocking unit 5 is placed in an open state after a first predetermined time period elapsed after injection of the chemical liquid starts. Further, in a case where injection of the chemical liquid into the subject is completed, a command to place the flow blocking unit 5 in a closed state may be sent after a second predetermined time period elapsed after injection of the chemical liquid is completed. The first predetermined time period is a time period in which a predetermined pressure is added so that the pressure in the common conduit portion increases in a state in which the flow blocking unit 5 has been placed in a closed state blocking the flow of chemical liquid. Further, specifically, the first predetermined time period is a time period in which, from a state in which the chemical liquid is not allowed to flow at all within the conduit, as a pressurization phase performed prior to injecting the actual chemical liquid into the subject, a low volume of chemical liquid is caused to flow as far as the flow blocking unit 5 at a prescribed injection rate determined in advance to raise the pressure inside the chemical liquid injection conduit as far as the flow blocking unit 5 to the predetermined pressure, in a state in which the flow blocking unit 5 has been placed in a closed state. The prescribed injection rate determined in advance is, for example, an injection rate slower than the rate of injecting the chemical liquid into the subject.

The second predetermined time period is a fixed time period in which a state is ensured in which the pressure inside the common conduit portion is high simultaneously with completion of the supply of the chemical liquid from the chemical liquid injector or in a state in which the flow blocking unit has been placed in a closed state blocking the flow of the chemical liquid. Specifically, because the rate of decrease in pressure can be predicted, the rate of decrease is ascertained in advance, and a fixed time period from completing injection of the chemical liquid as the second predetermined time period is specified based on a preliminary measurement that was performed in advance as a time period in which it can be ensured that the predetermined pressure (Psafe) higher by the order of several tens of kilopascals [kPa] (several pounds per square inch [psi]) than the assumed intravascular pressure will be reached from after completing injection of the chemical liquid. Further, in a case where the second predetermined time period is simultaneous with completion of injection of the chemical liquid, immediately after injection of the chemical liquid is completed, it is ensured that the pressure will be the predetermined pressure (Psafe) of the order of several tens of kilopascals [kPa] (several pounds per square inch [psi]) higher than the intravascular pressure. After the chemical liquid is injected, the pressure decreases thereafter, and hence the highest pressure will be secured immediately after injection of the chemical liquid is completed. Accordingly, by actuating the flow blocking unit 5 by means of the control device 40 in this way, body fluid of the subject does not flow back to upstream of the flow blocking unit 5, that is, does not flow back at least to the most downstream part of the common conduit portion 30.

For example, a sequence when injecting a chemical liquid and after injection of the chemical liquid will be described taking a case in which the flow blocking unit 5 is the shut-off valve 52 arranged along the flow of the mixture supply tube 18 as an example. First, the flow blocking unit 5 is placed in a closed state as illustrated in FIG. 2B in which the flow path 52c of the first piston 52a and the flow path 52d of the second piston 52b do not communicate and the flow of the chemical liquid is blocked. This state is a state before chemical liquid injection starts, in which the chemical liquid does not arrive at the flow blocking unit 5. Next, the flow blocking unit 5 is maintained in the closed state, and a pressurization phase is executed in which a low volume of the chemical liquid is flowed as far as the flow blocking unit 5 at a prescribed injection rate determined in advance. The prescribed injection rate determined in advance is, for example, an injection rate slower than the rate of injecting the chemical liquid into the subject. For example, in the pressurization phase, as one example, 0.3 milliliters of the chemical liquid is flowed at a rate of 2 milliliters per second for 150 milliseconds so that the chemical liquid reaches the flow blocking unit 5. The flow blocking unit 5 is shifted to the open state after 10 milliseconds from the time that the pressurization phase is started. The time after the aforementioned 10 milliseconds corresponds to the first predetermined time period. That is, when the 10 milliseconds as the first predetermined time period elapses after supply of the chemical liquid from the chemical liquid injector 20 was started, the flow blocking unit 5 is placed in the open state allowing a flow of the chemical liquid. In this case, for example, first, the flow path 52d of the second piston 52b that corresponds to the upstream side is opened, and next the flow path 52c of the first piston 52a on the downstream side is opened. That is, according to this sequence in a case where two or more pistons are used as the shut-off valve 52, since the pistons are opened in turn from the upstream side, the flow blocking unit 5 enters a completely open state in a state in which the piston furthest on the downstream side is opened. On the other hand, conversely, after injection of the chemical liquid, first, the first motor 23 and the second motor 24 are stopped after injection is completed. This is the timing at which injection is completed, and upon the second predetermined time period elapsing from this time point, the flow blocking unit 5 is placed in a closed state. In other words, first the flow blocking unit 5 is placed in a closed state simultaneously with stopping of the first motor 23 and the second motor 24, or after a fixed time period elapses. Generally, for example, after around several milliseconds to several seconds as a fixed time period has elapsed after the first motor 23 and the second motor 24 are stopped, the flow path 52c of the first piston 52a on the downstream side is closed. Next, the flow path 52d of the second piston 52b on the upstream side is closed to thereby place the flow blocking unit 5 in a closed state. According to this sequence in a case where the shut-off valve 52 uses two or more pistons, since the pistons are closed from the downstream side, the flow blocking unit 5 enters a completely closed state in a state in which the piston furthest on the upstream side is open. Although an example has been described above in which, in a case where two or more pistons are used as the shut-off valve 52, the shut-off valve 52 is closed by staggering the timings for closing the pistons, timings may also be used that set all of the pistons in an open state simultaneously, or set all of the pistons in a closed state simultaneously. For example, in the case of describing the shut-off valve 52 having the first piston 52a and the second piston 52b as an example of a case of a configuration having two or more pistons constituting the shut-off valve 52, during injection of the chemical liquid, since the cross-sectional area of the flow path 52d of the second piston 52b on the upstream side is set to be larger than the cross-sectional area of the flow path 52c of the first piston 52a, when the first piston 52a and the second piston 52b are driven simultaneously, first the flow path 52d of the second piston 52b on the upstream side communicates, and next, thereafter, the flow path 52c of the first piston 52a on the downstream side communicates. On the other hand, conversely, after injection of the chemical liquid, the flow blocking unit 5 can be placed in a closed state by simultaneously driving the first piston 52a and the second piston 52b after a fixed time period elapses after injection of the chemical liquid is completed and the first motor 23 and the second motor 24 are stopped, so that first the flow path 52c of the first piston 52a on the downstream side closes, and thereafter the flow path 52d of the second piston 52b on the upstream side closes. That is, by adjusting the timings for actuating the first piston 52a and the second piston 52b and adjusting the cross-sectional area of the flow path 52c of the first piston 52a and the cross-sectional area of the flow path 52d of the second piston 52b in this way, when placing the shut-off valve 52 in an open state, the pistons constituting the shut-off valve 52 are caused to function so that, among the pistons, the flow paths communicate in order from the upstream side to the downstream side, and when placing the shut-off valve 52 in a closed state, the pistons constituting the shut-off valve 52 are caused to function so that, among the pistons, the flow paths are blocked in order from the downstream side to the upstream side.

With respect to the timing at which the control device 40 sends a command for performing a step that places the flow blocking unit 5 in an open state allowing a flow of the chemical liquid (S3), and sends a command for performing a step that places the flow blocking unit 5 in a closed state blocking a flow of the chemical liquid (S7), it is also possible to determine the timing by directly measuring the intravascular pressure of the human with a pressure sensor or the like, and not a method that uniquely assumes the intravascular pressure of a human as a predetermined value without measuring the pressure at all as described above. For example, as the simplest method, the pressure detecting element 14 may be arranged at the port of the monitor line 19 for detecting the blood pressure or pulse of the subject, and the intravascular pressure of the subject may be measured. That is, the pressure detecting element 14 may be arranged at an arbitrary position of a conduit of either one of the replaceable conduit portion 10 and the common conduit portion 30. Any type of pressure sensor can be used as the pressure detecting element 14, and as a representative example, a pressure sensor such as a semiconductor pressure sensor or a piezoelectric element can be used. Further, at such time, if the position at which the pressure detecting element 14 is arranged is on the side near to the subject, the intravascular pressure of the subject can be measured more accurately, although it is not necessarily required to accurately measure the intravascular pressure of the subject. It suffices that it is known whether the pressure inside the chemical liquid injection conduit is higher than the intravascular pressure of the subject. Accordingly, the pressure detecting element 14 may be arranged in the vicinity of the inside of the first syringe 21 or the second syringe 22 and may directly measure the pressure. A configuration can also be adopted in which the predetermined pressure (Psafe) is determined according to an electrical signal output from the pressure detecting element 14, and the control device 40 sends a command to place the flow blocking unit 5 in an open state allowing a flow of chemical liquid or to place the flow blocking unit 5 in a closed state blocking a flow of chemical liquid, based on detection of an electrical signal corresponding to the predetermined pressure (Psafe) by the pressure detecting element 14.

In addition, with respect to the timing at which the control device 40 sends a command for performing the step of placing the flow blocking unit 5 in an open state allowing a flow of the chemical liquid (S3), and sends a command for performing the step of placing the flow blocking unit 5 in a closed state blocking a flow of the chemical liquid (S7), the pressure inside the chemical liquid injection conduit need not be directly measured. That is, it suffices to determine the predetermined pressure (Psafe) according to a value corresponding to the amount of electric power input to the drive motors for driving the first motor 23 and the second motor 24 that are the drive motors. Further, when determining the pressure inside the chemical liquid injection conduit, as a value corresponding to the amount of electric power input to the drive motor, in the case of PWM control using a pulse of a constant voltage, since the amount of electric power input to the drive motor is proportional to the electric current input to the drive motor, the value of the electric current input to the drive motor can be adopted. Accordingly, values corresponding to the amount of electric power input to a drive motor include the value of electric current input to the drive motor. In this case, for example, the relation between values corresponding to the amount of electric power input to each of the first motor 23 and the second motor 24 and the pressure inside the chemical liquid injection conduit is acquired in advance as data. Since the rotational speed and rotation angle of each of the first motor 23 and the second motor 24 correspond to an electrical signal having a value (includes a value corresponding to electric current) corresponding to the amount of electric power output from the central processing unit 41 of the control device 40, correspondence data showing the relation between the electrical signal and the pressure inside the chemical liquid injection conduit is created in advance, and the data is stored in the memory device 44. Then, from a state in which the flow blocking unit 5 is in a closed state, the first motor 23 and the second motor 24 that received a command from the control device 40 cause the corresponding piston 21c of the first syringe 21 or piston 22c of the second syringe 22 to move forward according to a predetermined sequence. Here, the central processing unit 41 of the control device 40 determines the pressure inside the chemical liquid injection conduit based on an electrical signal (electrical signal corresponding to the amount of electric power or electric current input to the drive motors) input to the first motor 23 and the second motor 24 when driving the first motor 23 and the second motor 24, as illustrated in FIG. 3A. The pressure in the common conduit portion 30 becomes higher than the pressure on the replaceable conduit portion 10 side at a stage (stage at which time period T1 elapsed) at which an electrical signal input to the first motor 23 and the second motor 24 reaches a value at which the pressure inside the chemical liquid injection conduit corresponds to the predetermined pressure (Psafe). Therefore, the control device 40 sends a command to the driving means 6 to place the flow blocking unit 5 in a closed state, in an open state. In this state, body fluid of the subject does not flow back to upstream of the flow blocking unit 5, that is, does not flow back at least to the most downstream part of the common conduit portion 30.

The same applies in the opposite situation. That is, when the chemical liquid inside the first syringe 21 or the second syringe 22 runs out, the pressure inside the chemical liquid injection conduit that includes the first syringe 21 or the second syringe 22 begins to drop (time point at which time period T3 elapsed). At a time point at which it is determined that the pressure inside the chemical liquid injection conduit has become the predetermined pressure (Psafe) based on the electrical signal transmitted to the first motor 23 and the second motor 24 (time point at which time period T4 elapsed), the control device 40 sends a command to the driving means 6 to place the flow blocking unit 5 in an open state, in a closed state. At this stage, the pressure in the common conduit portion 30 is higher than the pressure on the replaceable conduit portion 10 side. In this state, body fluid of the subject does not flow back as far as the common conduit portion 30. Detachment of the common conduit portion 30 from the replaceable conduit portion 10 can be performed in this state.

Figure 4:
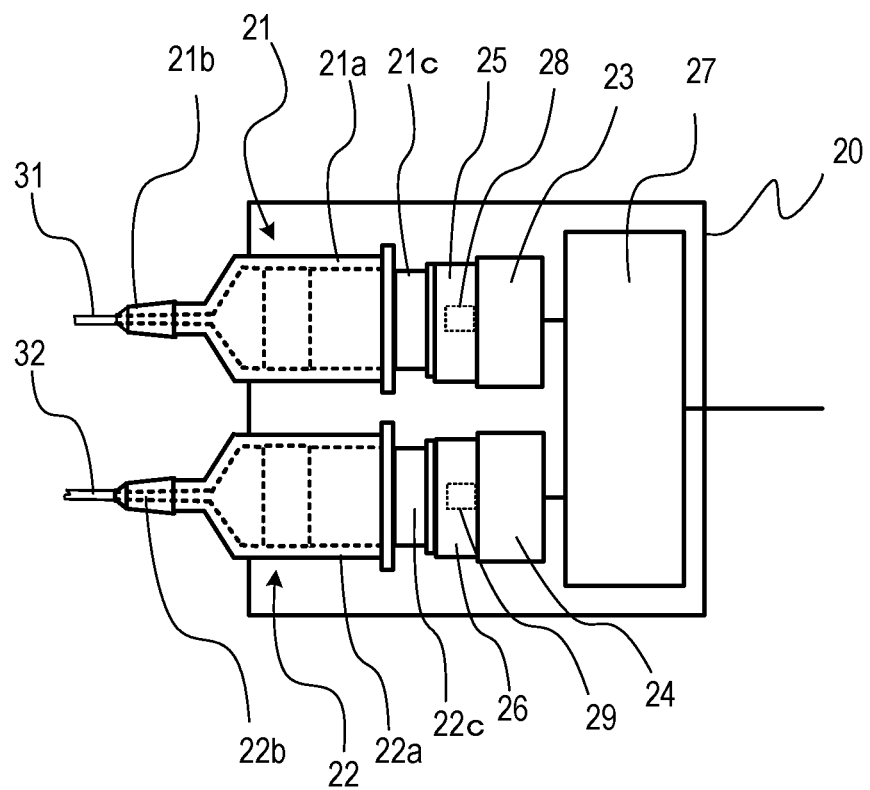
FIG. 4 is a view illustrating one example of a method for measuring the pressure inside the chemical liquid injection conduit of the present invention.

Further, as a method that does not directly measure the pressure inside the chemical liquid injection conduit, a method is also available that does not use an electrical signal transmitted to the first motor 23 and the second motor 24 that are drive motors. FIG. 4 illustrates a portion of the chemical liquid injector 20 illustrated in FIG. 1. As illustrated in FIG. 4, in the method which does not use an electrical signal, a pressing force detecting element is arranged in each of the pressing members which directly press the pistons of the syringes. Examples of an apparatus that can be used as the pressing force detecting element include, as a simple apparatus, a load cell, and similarly to the principle of a load cell, a strain gauge which is attached to the pressing member and which indirectly measures a pressing force based on an electrical signal output based on the amount of strain of the pressing member. By means of such kind of pressing force detecting element, when a motor pushes a pressing member, the pressing force with which the motor presses the piston can be obtained based on an electrical signal that the corresponding pressing force detecting element outputs. First, the correlation between an electrical signal output by the pressing force detecting element when a motor presses a piston and the pressure inside the chemical liquid injection conduit that includes the corresponding syringe is measured in advance. This correlation corresponds to the correlation between the pressing force with which the motor presses the piston and the pressure inside the chemical liquid injection conduit that includes the syringe. Subsequently, based on the correlation, the pressure inside the chemical liquid injection conduit that includes the syringe is determined based on the electrical signal that the pressing force detecting element outputs. That is, when adopting load cells as the pressing force detecting elements, the situation will be as follows. A load cell 28 and a load cell 29 are attached to the pressing member 25 that presses the piston 21c of the first syringe 21 so that the first motor 23 causes the piston 21c to move, and to the pressing member 26 with which the second motor 24 causes the piston 22c of the second syringe 22 to move, respectively. The relation between an electrical signal output from the load cell 28 and the pressure inside the chemical liquid injection conduit is acquired in advance, and the correspondence data thereof is stored in the memory device 44. The pressure inside the chemical liquid injection conduit is determined based on this electrical signal. Specifically, first, from a state in which the flow blocking unit 5 is in a closed state, the first motor 23 and the second motor 24 that received a command from the control device 40 move the piston 21c of the first syringe 21 and the piston 22c of the second syringe 22 through the outer cylinder 21a and the outer cylinder 22a, respectively, according to a predetermined sequence while pressing the piston 21c and the piston 22c through the pressing member 25 and the pressing member 26. At such time, the load cell 28 and the load cell 29 each output an electrical signal which is responsive to the pressing force with which the first motor 23 presses the piston 21c of the first syringe 21 and the pressing force with which the second motor 24 presses the piston 22c of the second syringe 22, respectively. The pressure inside the chemical liquid injection conduit is determined based on this electrical signal in the manner illustrated in FIG. 3A. At a stage (stage at which time period T1 elapsed) at which it is determined based on the respective electrical signals output from the load cell 28 and the load cell 29 that the relevant electrical signal reached a value at which the pressure inside the chemical liquid injection conduit corresponds to the predetermined pressure (Psafe), the pressure in the common conduit portion 30 is higher than the pressure on the replaceable conduit portion 10 side. Therefore, the control device 40 sends a command to the driving means 6 to place the flow blocking unit 5 in a closed state, in an open state. In this state, body fluid of the subject does not flow back to upstream of the flow blocking unit 5, that is, does not flow back at least to the most downstream part of the common conduit portion 30.

The same applies in the opposite situation. That is, when the chemical liquid inside the first syringe 21 or the second syringe 22 runs out, the pressure inside the chemical liquid injection conduit that includes the first syringe 21 or the second syringe 22 begins to drop (time point at which time period T3 elapsed). The respective amounts of strain with which the first motor 23 and the second motor 24 press the piston 21c and the piston 22c are determined based on the respective electrical signals output from the load cell 28 and the load cell 29, and at a timing (time point at which time period T4 elapsed) at which it is determined based on the electrical signals that the pressure inside the chemical liquid injection conduit has become the predetermined pressure (Psafe), the control device 40 sends a command to the driving means 6 to place the flow blocking unit 5 which is in the open state, in the closed state. At this stage, the pressure in the common conduit portion 30 is higher than the pressure on the replaceable conduit portion 10 side. In this state, body fluid of the subject does not flow back as far as the common conduit portion 30. Detachment of the common conduit portion 30 from the replaceable conduit portion 10 can be performed in this state.

Example 2

Figure 5:
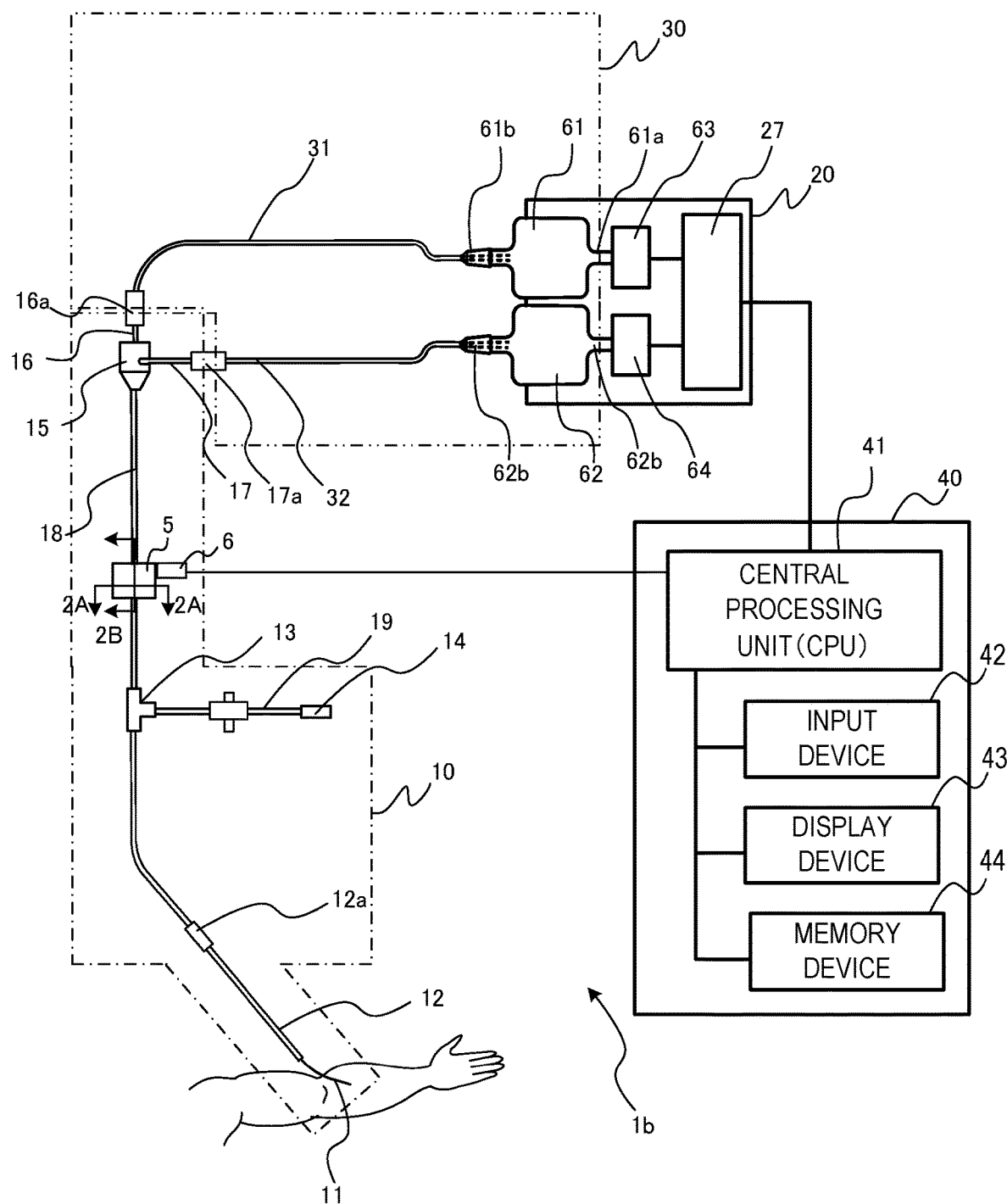
FIG. 5 is a schematic diagram illustrating a chemical liquid injecting apparatus of Example 2 of one embodiment of the present invention.

A form other than syringes can also be adopted with respect to the chemical liquid injector 20. Hereunder, Example 2 in which a form other than syringes is adopted with respect to the chemical liquid injector 20 is described referring to FIG. 5. Example 2 is, among the types in the embodiment described above, a type in which a pressurizing apparatus that performs discharge of a chemical liquid by pressurizing the inside of a container holding the chemical liquid is used as chemical liquid supply unit. FIG. 5 illustrates an overall configuration diagram of a chemical liquid injecting apparatus 1b of Example 2. The chemical liquid injecting apparatus 1b is the same as the chemical liquid injecting apparatus in Example 1 in the respect that the chemical liquid injecting apparatus 1b includes the replaceable conduit portion 10, the chemical liquid injector 20, the common conduit portion 30 and the control device 40, and is also the same as the chemical liquid injecting apparatus in Example 1 in the respect of being configured so that a chemical liquid supplied from the chemical liquid injector 20 first flows into the common conduit portion 30 that is a chemical liquid injection conduit, and flows from the common conduit portion 30 to the replaceable conduit portion 10. In Example 2 also, the replaceable conduit portion 10 and the common conduit portion 30 form a chemical liquid injection conduit, and the replaceable conduit portion 10 is replaced for each subject, while on the other hand the common conduit portion 30 is used commonly for a plurality of subjects. Hereunder, the points in which Example 2 differs from Example 1 are described. Apart from the following differences, the configuration of Example 1 can be applied as it is.

Although in the chemical liquid injecting apparatus 1a of Example 1 the chemical liquid injector 20 is in the form of syringes, in Example 2 the chemical liquid sources of the chemical liquid injector 20 are a first container 61 for supplying a contrast medium as a first chemical liquid and a second container 62 for supplying a physiological saline as a second chemical liquid. The first container 61 and the second container 62 may each be a hard resin container or may each be flexible bag-like resin container. Any material may be used as the material thereof. The chemical liquid supply unit of the chemical liquid injector 20 are a first pressure pump 63 and a second pressure pump 64 that pressurize the first container 61 and the second container 62, respectively. The control circuit 27 is the same as in Example 1, and the first pressure pump 63 and the second pressure pump 64 are controlled by the control circuit 27. The first pressure pump 63 and the second pressure pump 64 pressurize the first chemical liquid inside the first container 61 and the second chemical liquid inside the second container 62 through a pressurization opening 61a of the first container 61 and a pressurization opening 62a of the second container 62.

The configuration of the replaceable conduit portion 10 and configuration of the control device 40 are the same as in Example 1. The configuration of the common conduit portion 30 is approximately the same as in Example 1, except that the common conduit portion 30 differs from Example 1 in that the first chemical liquid bag 34 is not connected to the conduit of the first chemical liquid line 31, and the second chemical liquid bag 36 is not connected to the conduit of the second chemical liquid line 32. The remaining configuration is the same as Example 1, including the point of having the first chemical liquid line 31 through which a contrast medium as the first chemical liquid flows and having the second chemical liquid line 32 through which a physiological saline as the second chemical liquid flows.

An opening 61b in the first container 61 is fluidly connected to the first chemical liquid line 31, and an opening 62b in the second container 62 is fluidly connected to the second chemical liquid line 32. Control by the control device 40 for actuating the first pressure pump 63 and the second pressure pump 64 is similar to Example 1. That is, the first pressure pump 63 and the second pressure pump 64 that received a command from the control device 40 pressurize the first container 61 and the second container 62 according to a predetermined sequence. Here, similarly to Example 1, the central processing unit 41 of the control device 40 determines the pressure inside the chemical liquid injection conduit based on an electrical signal (electrical signal corresponding to the amount of electric power or electric current input to the respective pressure pumps) input to the first pressure pump 63 and the second pressure pump 64 when driving the first pressure pump 63 and the second pressure pump 64, as illustrated in FIG. 3A. The pressure in the common conduit portion 30 becomes higher than the pressure on the replaceable conduit portion 10 side at a stage (stage at which time period T1 elapsed) at which an electrical signal input to each of the first pressure pump 63 and the second pressure pump 64 reaches a value at which the pressure inside the chemical liquid injection conduit corresponds to the predetermined pressure (Psafe). Therefore, the control device 40 sends a command to the driving means 6 to place the flow blocking unit 5 in a closed state, in an open state. In this state, body fluid of the subject does not flow back to upstream of the flow blocking unit 5, that is, does not flow back at least to the most downstream part of the common conduit portion 30.

The same applies in the opposite situation. That is, when the chemical liquid inside the first container 61 or the second container 62, respectively, runs out, the pressure inside the chemical liquid injection conduit that includes the first container 61 or the second container 62 begins to drop (time point at which time period T3 elapsed). At a time point at which it is determined that the pressure inside the chemical liquid injection conduit has become the predetermined pressure (Psafe) based on the electrical signal transmitted to the first pressure pump 63 and the second pressure pump 64 (time point at which time period T4 elapsed), the control device 40 sends a command to the driving means 6 to place the flow blocking unit 5 in an open state, in a closed state. At this stage, the pressure in the common conduit portion 30 is higher than the pressure on the replaceable conduit portion 10 side. In this state, body fluid of the subject does not flow back as far as the common conduit portion 30. Detachment of the common conduit portion 30 from the replaceable conduit portion 10 can be performed in this state. Thus, in Example 2 also, similarly to Example 1, a timing at which the pressure in the common conduit portion 30 becomes higher than the pressure on the replaceable conduit portion 10 side can be created.

Example 3

Figure 6:
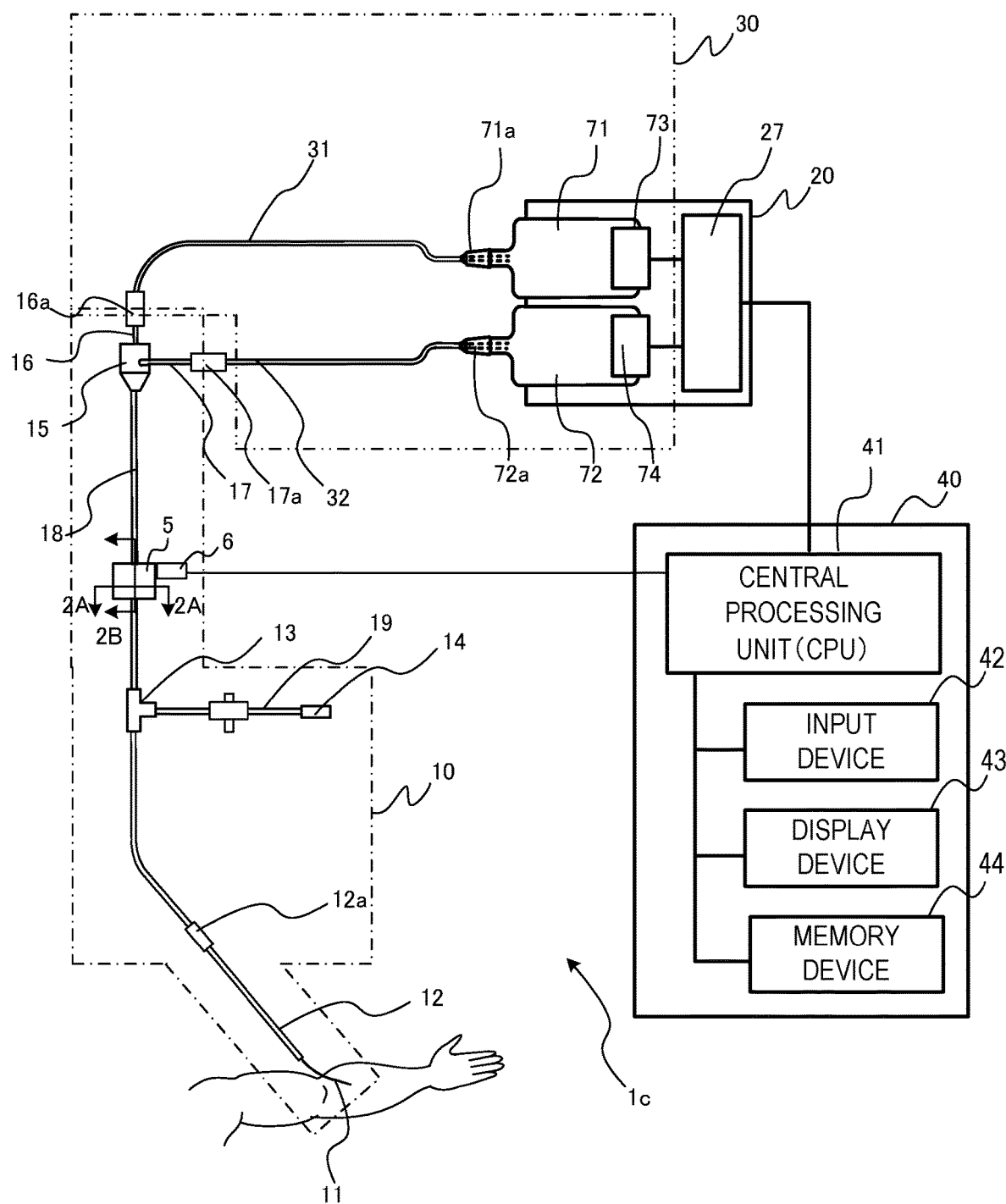
FIG. 6 is a schematic diagram illustrating a chemical liquid injecting apparatus of Example 3 of one embodiment of the present invention.

The following form can also be adopted in a case where a flexible bag-like resin container is used as the first container 61 and the second container 62 of the chemical liquid injector 20. Hereunder, Example 3 will be described referring to FIG. 6, FIG. 7A and FIG. 7B. Example 3 is, among the types in the embodiment described above, a type in which a pressurizing apparatus that performs the discharge of a chemical liquid by pressurizing the inside of a container holding the chemical liquid by pressing the outside of the container is used as chemical liquid supply unit. Example 3 is an example obtained by changing Example 2. FIG. 6 illustrates an overall configuration diagram of a chemical liquid injecting apparatus 1c of Example 3. The chemical liquid injecting apparatus 1c is the same as the chemical liquid injecting apparatus in Example 1 in the respect that the chemical liquid injecting apparatus 1c includes the replaceable conduit portion 10, the chemical liquid injector 20, the common conduit portion 30 and the control device 40, and is also the same as Example 1 in the respect of being configured so that a chemical liquid supplied from the chemical liquid injector 20 first flows into the common conduit portion 30 that is a chemical liquid injection conduit, and flows from the common conduit portion 30 to the replaceable conduit portion 10. In Example 3 also, the replaceable conduit portion 10 and the common conduit portion 30 form a chemical liquid injection conduit, and the replaceable conduit portion 10 is replaced for each subject, while on the other hand the common conduit portion 30 is used commonly for a plurality of subjects. Hereunder, the points in which Example 3 differs from Example 2 are described. Apart from the following differences, the configuration of Example 2 can be applied as it is.

Figure 7A:
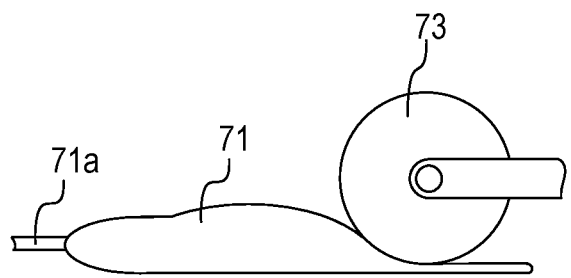
FIG. 7A is a schematic diagram illustrating one example of a pressurizing body of the chemical liquid injecting apparatus of Example 3 of the present invention.

In the chemical liquid injecting apparatus 1c of Example 3, the chemical liquid supply unit is not a pressure pump, but is instead pressurization means that presses and pressurizes the container. In Example 2, a configuration is adopted in which the inside of the respective containers that are chemical liquid sources is pressurized to cause the respective chemical liquids to first flow into the common conduit portion 30 that is a chemical liquid injection conduit, and then flow from the common conduit portion 30 to the replaceable conduit portion 10. In contrast, in Example 3, a configuration is adopted in which the containers that are the chemical liquid sources are pressurized from outside to cause the respective chemical liquids to first flow into the common conduit portion 30 that is a chemical liquid injection conduit, and then flow from the common conduit portion 30 to the replaceable conduit portion 10. That is, in Example 3, the chemical liquid sources of the chemical liquid injector 20 are a first container 71 for supplying a contrast medium as a first chemical liquid, and a second container 72 for supplying a physiological saline as a second chemical liquid. The first container 71 and the second container 72 are each typically a flexible bag-like container, and although they are typically resin bags, any material may be used as the material thereof. As illustrated in FIG. 7A, the chemical liquid supply unit of the chemical liquid injector 20 are a first pressurizing body 73 and a second pressurizing body 74 which are pressurization means for pressurizing the first container 71 and the second container 72, respectively. The first pressurizing body 73 and the second pressurizing body 74 are each, for example, a roller-like member that is driven by a motive force of a motor or the like, and crush the first container 71 and the second container 72 and proceed in the direction of an opening 71a and an opening 72a while pressing the first container 71 and the second container 72 that are flexible. The control circuit 27 is the same as in Example 1, and the first pressurizing body 73 and the second pressurizing body 74 are controlled by the control circuit 27. When the first pressurizing body 73 and the second pressurizing body 74 crush the first container 71 and the second container 72, the pressure of the chemical liquid inside the first container 71 and inside the second container 72 increases and causes the first chemical liquid inside the first container 71 and the second chemical liquid inside the second container 72 to flow. Further, the first pressurizing body 73 and the second pressurizing body 74 may be members that, by undergoing a volume change caused by increasing the internal pressure of a compressible fluid such as air enclosed in a flexible bag-like container capable of undergoing a volume change, press and compress the first container 71 and the second container 72 to raise the pressure of the chemical liquid inside the first container 71 and the second container 72.

The configuration of the replaceable conduit portion 10 and configuration of the control device 40 are the same as in Example 1. The configuration of the common conduit portion 30 is approximately the same as in Example 1, except that the common conduit portion 30 differs from Example 1 in that the first chemical liquid bag 34 is not connected to the conduit of the first chemical liquid line 31, and the second chemical liquid bag 36 is not connected to the conduit of the second chemical liquid line 32. The remaining configuration is the same as Example 1, including the point of having the first chemical liquid line 31 through which a contrast medium flows as the first chemical liquid and having the second chemical liquid line 32 through which a physiological saline flows as the second chemical liquid.

An opening 71a in the first container 71 is fluidly connected to the first chemical liquid line 31, and an opening 72a in the second container 72 is fluidly connected to the second chemical liquid line 32. Control by the control device 40 for actuating the first pressurizing body 73 and the second pressurizing body 74 is similar to Example 1. That is, the first pressurizing body 73 and the second pressurizing body 74 that received a command from the control device 40 pressurize the first container 71 and the second container 72 according to a predetermined sequence. Here, similarly to Example 1, the central processing unit 41 of the control device 40 determines the pressure inside the chemical liquid injection conduit based on an electrical signal (electrical signal corresponding to the amount of electric power or electric current input to the respective pressure pumps) input to the first pressurizing body 73 and the second pressurizing body 74 when driving the first pressurizing body 73 and the second pressurizing body 74, as illustrated in FIG. 3A. The pressure in the common conduit portion 30 becomes higher than the pressure on the replaceable conduit portion 10 side at a stage (stage at which time period T1 elapsed) at which an electrical signal input to the first pressurizing body 73 and the second pressurizing body 74 reaches a value at which the pressure inside the chemical liquid injection conduit corresponds to the predetermined pressure (Psafe). Therefore, the control device 40 sends a command to the driving means 6 to place the flow blocking unit 5 in a closed state, in an open state. In this state, body fluid of the subject does not flow back to upstream of the flow blocking unit 5, that is, does not flow back at least to the most downstream part of the common conduit portion 30.

The same applies in the opposite situation. That is, when the chemical liquid inside the first container 71 or the second container 72, respectively, runs out, the pressure inside the chemical liquid injection conduit that includes the first container 71 or the second container 72 begins to drop (time point at which time period T3 elapsed). At a time point at which it is determined that the pressure inside the chemical liquid injection conduit has become the predetermined pressure (Psafe) based on the electrical signal transmitted to the first pressurizing body 73 and the second pressurizing body 74 (time point at which time period T4 elapsed), the control device 40 sends a command to the driving means 6 to place the flow blocking unit 5 in an open state, in a closed state. At this stage, the pressure in the common conduit portion 30 becomes higher than the pressure on the replaceable conduit portion 10 side. In this state, body fluid of the subject does not flow back as far as the common conduit portion 30. Detachment of the common conduit portion 30 from the replaceable conduit portion 10 can be performed in this state. Thus, in Example 3 also, similarly to Example 1, a timing at which the pressure in the common conduit portion 30 becomes higher than the pressure on the replaceable conduit portion 10 side can be created.

Figure 7B:
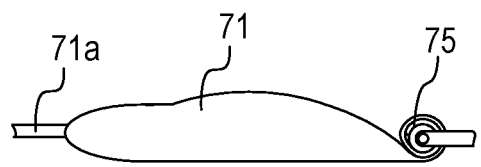
FIG. 7B is a schematic diagram illustrating a different example of a pressurizing body of the chemical liquid injecting apparatus of Example 3 of the present invention.

As a modification of Example 3, a pressure winding body 75 as illustrated in FIG. 7B may be adopted as the first pressurizing body 73 and the second pressurizing body 74, respectively. That is, according to the modification of Example 3, although the first container 71 and the second container 72 are each typically a flexible bag-like container, and are typically a bag made of resin, any material may be used as the material thereof. As illustrated in FIG. 7A, the chemical liquid supply unit of the chemical liquid injector 20 is the pressure winding body 75 that pressurizes the first container 71 and the second container 72, respectively. The pressure winding body 75 advances while crushing the first container 71 and the second container 72 in the direction of the opening 71a and the opening 72a while winding up the first container 71 and the second container 72 which are flexible. The control circuit 27 is the same as in Example 1, and the pressure winding body 75 is controlled by the control circuit 27. By means of the pressure winding body 75, the pressure of the chemical liquid inside the first container 71 and inside the second container 72 is raised from outside of the interior of the first container 71 and the interior of the second container 72, and the first chemical liquid inside the first container 71 and the second chemical liquid inside the second container 72 are caused to flow. Subsequently, at a stage (stage at which time period T1 elapsed) at which an electrical signal input to the pressure winding body 75 from the control device 40 reaches a value at which the pressure inside the chemical liquid injection conduit corresponds to the predetermined pressure (Psafe), the pressure in the common conduit portion 30 becomes higher than the pressure on the replaceable conduit portion 10 side. Therefore, the control device 40 sends a command to the driving means 6 to place the flow blocking unit 5 in a closed state, in an open state. In this state, body fluid of the subject does not flow back as far as the common conduit portion 30. Further, at a timing (time point at which time period T4 elapsed) at which it is determined that the pressure inside the chemical liquid injection conduit has become the predetermined pressure (Psafe) based on the electrical signal input to the pressure winding body 75, the control device 40 sends a command to the driving means 6 to place the flow blocking unit 5 in an open state, in a closed state. At this stage, the pressure in the common conduit portion 30 is higher than the pressure on the replaceable conduit portion 10 side. In this state, body fluid of the subject does not flow back as far as the common conduit portion 30. Detachment of the common conduit portion 30 from the replaceable conduit portion 10 can be performed in this state. Thus, in Example 3 also, similarly to Example 1, a timing at which the pressure in the common conduit portion 30 becomes higher than the pressure on the replaceable conduit portion 10 side can be created.

Example 4

Figure 8:
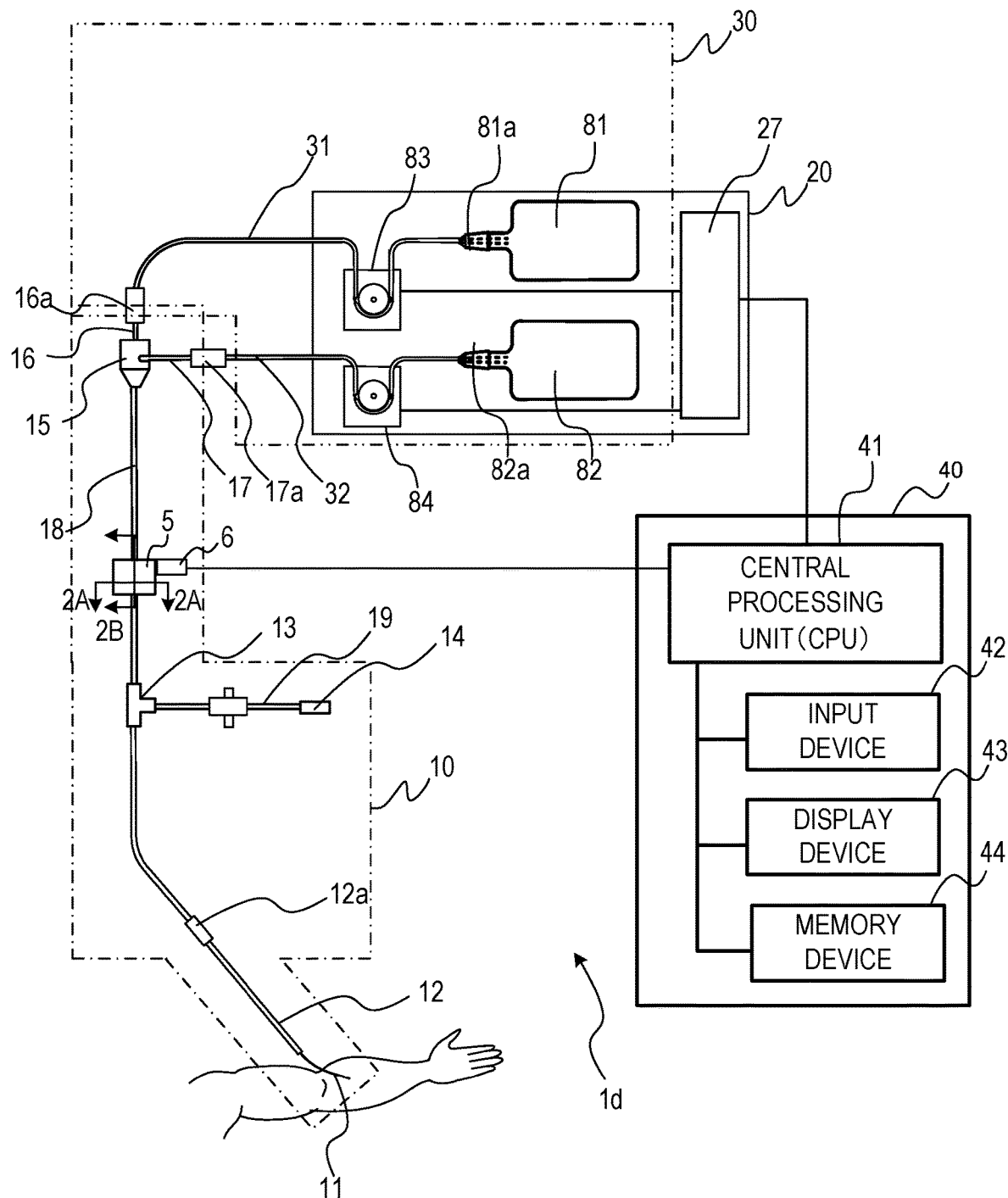
FIG. 8 is a schematic diagram illustrating a chemical liquid injecting apparatus of Example 4 of one embodiment of the present invention.
Figure 9:
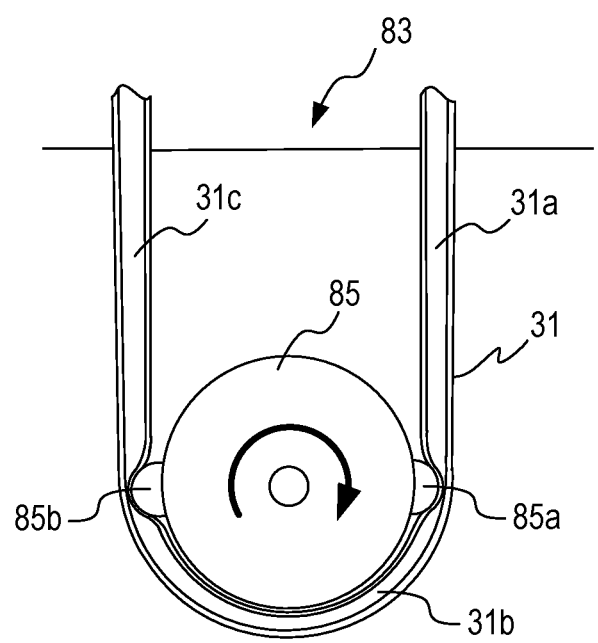
FIG. 9 is a functional schematic diagram illustrating a roller pump of the chemical liquid injecting apparatus of Example 4 of the present invention.

Next, Example 4 will be described referring to FIG. 8 and FIG. 9. Example 4 is, among the types in the embodiment described above, a type that reduces the pressure in a conduit on the downstream side to pump a chemical liquid. FIG. 8 illustrates an overall configuration diagram of a chemical liquid injecting apparatus 1*d* of Example 4. The chemical liquid injecting apparatus 1*d* is the same as the chemical liquid injecting apparatus in Example 1 in the respect that the chemical liquid injecting apparatus 1*d* includes the replaceable conduit portion 10, the chemical liquid injector 20, the common conduit portion 30 and the control device 40, and is also the same in the respect of being configured so that a chemical liquid supplied from the chemical liquid injector 20 first flows into the common conduit portion 30 that is a chemical liquid injection conduit, and flows from the common conduit portion 30 to the replaceable conduit portion 10. In Example 4 also, the replaceable conduit portion 10 and the common conduit portion 30 form a chemical liquid injection conduit, and the replaceable conduit portion 10 is replaced for each subject, while on the other hand the common conduit portion 30 is used commonly for a plurality of subjects. Hereunder, the points in which Example 4 differs from Example 3 are described. In the chemical liquid injecting apparatus 1*d* of Example 4, a roller pump 83 and a roller pump 84 are used as chemical liquid supply unit. Apart from the following differences, the configuration of Example 3 can be applied as it is.

The chemical liquid injector 20 includes chemical liquid supply sources and pumps. The chemical liquid sources of the chemical liquid injector 20 are a first container 81 for supplying a contrast medium as a first chemical liquid and a second container 82 for supplying a physiological saline as a second chemical liquid. Any type of pump can be applied as the pumps, as long as the pump has a structure of a type that reduces the pressure in the conduit on the downstream side while pressing the conduit, and thereby pumps the chemical liquid inside the conduit on the upstream side to the conduit on the downstream side. A roller pump and a finger pump may be mentioned as representative examples of this type of pump. Here, as one example, the roller pump 83 and the roller pump 84 are described as the pumps. The first container 81 and the second container 82 may each be a hard resin container or may be a flexible bag-like resin container. Any material may be used as the material thereof. The roller pump 83 and the roller pump 84 are arranged in the conduit of the first chemical liquid line 31 joined to an opening 81*a* of the first container 81 of the common conduit portion 30, and in the conduit of the second chemical liquid line 32 joined to an opening 82*a* of the second container 82, respectively. The roller pump 83 and the roller pump 84 may be mounted at any locations in the chemical liquid conduits of the common conduit portion 30, as long as the locations are upstream of the flow blocking unit 5. The roller pump 83 and the roller pump 84 may also be mounted in the mixture supply tube 18. The conduit of the first chemical liquid line 31 and the conduit of the second chemical liquid line 32 in which the roller pump 83 and the roller pump 84 are arranged are each made of a soft tube, and the conduit of the first chemical liquid line 31 and the conduit of the second chemical liquid line 32 are fixed and arranged to be wound around a rotary body 85.

The roller pump 83 and the roller pump 84 will now be described referring to FIG. 9. FIG. 9 is a functional configuration diagram illustrating the roller pump 83 in an enlarged manner. The roller pump 84 has the same structure as the roller pump 83, and hence the description of the roller pump 83 will be used to substitute for a description of the roller pump 84. The roller pump 83 has the rotary body 85. The rotary body 85 is rotatable around the center of rotation of the rotary body. The rotary body 85 has at least two pressing portions, namely, a pressing portion 85*a* and a pressing portion 85*b*, that protrude so that arcuate distances therebetween are equal distances on the circumference of a circle centered on the center of rotation of the rotary body 85. That is, the two pressing portions 85*a* and 85*b* are arranged at a central angle of 180 degrees on the circumference of a circle centered on the center of rotation of the rotary body 85. For example, in a case of providing three pressing portions, the pressing portions are arranged at a central angle of 120 degrees, and in a case of providing four pressing portions, the pressing portions are arranged at a central angle of 90 degrees.

The pressing portion 85*a* and the pressing portion 85*b* of the two protrusions each crush the conduit of the first chemical liquid line 31. At the places where the pressing portion 85*a* and the pressing portion 85*b* crush the conduit of the first chemical liquid line 31, the conduit of the first chemical liquid line 31 is constricted and a section 31*b* into which the chemical liquid can enter is created between the pressing portion 85*a* and the pressing portion 85*b*. On both sides of the section 31*b*, a section 31*a* on the upstream side and a section 31*c* on the downstream side are formed. In this state, for example, when the rotary body 85 is rotated clockwise in FIG. 9 (in the direction of the arrow in FIG. 9), the pressing portion 85*a* moves over the section 31*b* while squeezing the conduit of the first chemical liquid line 31. When the pressing portion 85*a* and the pressing portion 85*b* move by an amount corresponding to the central angle 180 of the center of rotation of the rotary body 85, the positions of the pressing portion 85*a* and the pressing portion 85*b* are reversed. During this movement, with respect to the pressure at the place which the pressing portion 85*a* constricted, because the state is one in which internal pressure has been reduced in comparison to the section 31*a* and the section 31*c* on both end sides, the pressure in the section 31*b* is lower than in the section 31*a* on the upstream side, and when the pressing portion 85*b* arrives at the place at which the pressing portion 85*a* had been located, the chemical liquid in the section 31*a* on the upstream side flows into the section 31*b* and thus the chemical liquid enters the section 31*b* between the pressing portion 85*a* and the pressing portion 85*b*. In this state, when the rotary body 85 is further rotated, the pressing portion 85*b* moves over the section 31*b* while the pressing portion 85*b* squeezes the conduit of the first chemical liquid line 31 to pump the chemical liquid of the conduit of the first chemical liquid line 31, and the chemical liquid moves to the section 31*c* on the downstream side. Thus, by continuously rotating the rotary body 85, the chemical liquid of the first container 81 and the chemical liquid of the second container 82 are supplied to the conduit of the first chemical liquid line 31 and the second chemical liquid line 32, and supplied from the common conduit portion 30 to the replaceable conduit portion 10. The remaining configuration is the same as Example 1, including the point of having the first chemical liquid line 31 through which a contrast medium as the first chemical liquid flows and having the second chemical liquid line 32 through which a physiological saline as the second chemical liquid flows.

Control by the control device 40 for actuating the roller pump 83 and the roller pump 84 is similar to Example 1. That is, the roller pump 83 and the roller pump 84 that received a command from the control device 40 reduce the pressure of the conduit at a portion corresponding to the section 31b between the pressing portion 85a and the pressing portion 85b of the conduit of the first chemical liquid line 31 and the second chemical liquid line 32 according to a predetermined sequence. Here, similarly to Example 1, the central processing unit 41 of the control device 40 determines the pressure inside the chemical liquid injection conduit based on an electrical signal (electrical signal corresponding to the amount of electric power or electric current input to the roller pump 83 and the roller pump 84) input to the roller pump 83 and the roller pump 84 when driving the roller pump 83 and the roller pump 84, as illustrated in FIG. 3A. The pressure in the common conduit portion 30 becomes higher than the pressure on the replaceable conduit portion 10 side at a stage (stage at which time period T1 elapsed) at which the electrical signal input to the roller pump 83 and the roller pump 84 reaches a value at which the pressure inside the chemical liquid injection conduit corresponds to the predetermined pressure (Psafe). Therefore, the control device 40 sends a command to the driving means 6 to place the flow blocking unit 5 in a closed state, in an open state. In this state, body fluid of the subject does not flow back to upstream of the flow blocking unit 5, that is, does not flow back at least to the most downstream part of the common conduit portion 30.

The same applies in the opposite situation. That is, when the chemical liquid inside the first container 81 or the second container 82, respectively, runs out, the pressure inside the chemical liquid injection conduit that includes the first container 81 or the second container 82 begins to drop (time point at which time period T3 elapsed). At a timing at which it is determined that the pressure inside the chemical liquid injection conduit has become the predetermined pressure (Psafe) based on the electrical signal transmitted to the roller pump 83 and the roller pump 84 (time point at which time period T4 elapsed), the control device 40 sends a command to the driving means 6 to place the flow blocking unit 5 in an open state, in a closed state. At this stage, the pressure in the common conduit portion 30 is higher than the pressure on the replaceable conduit portion 10 side. In this state, body fluid of the subject does not flow back as far as the common conduit portion 30. Detachment of the common conduit portion 30 from the replaceable conduit portion 10 can be performed in this state. Thus, in Example 3 also, similarly to Example 1, a timing at which the pressure in the common conduit portion 30 becomes higher than the pressure on the replaceable conduit portion 10 side can be created.

Other Embodiment

Figure 10:
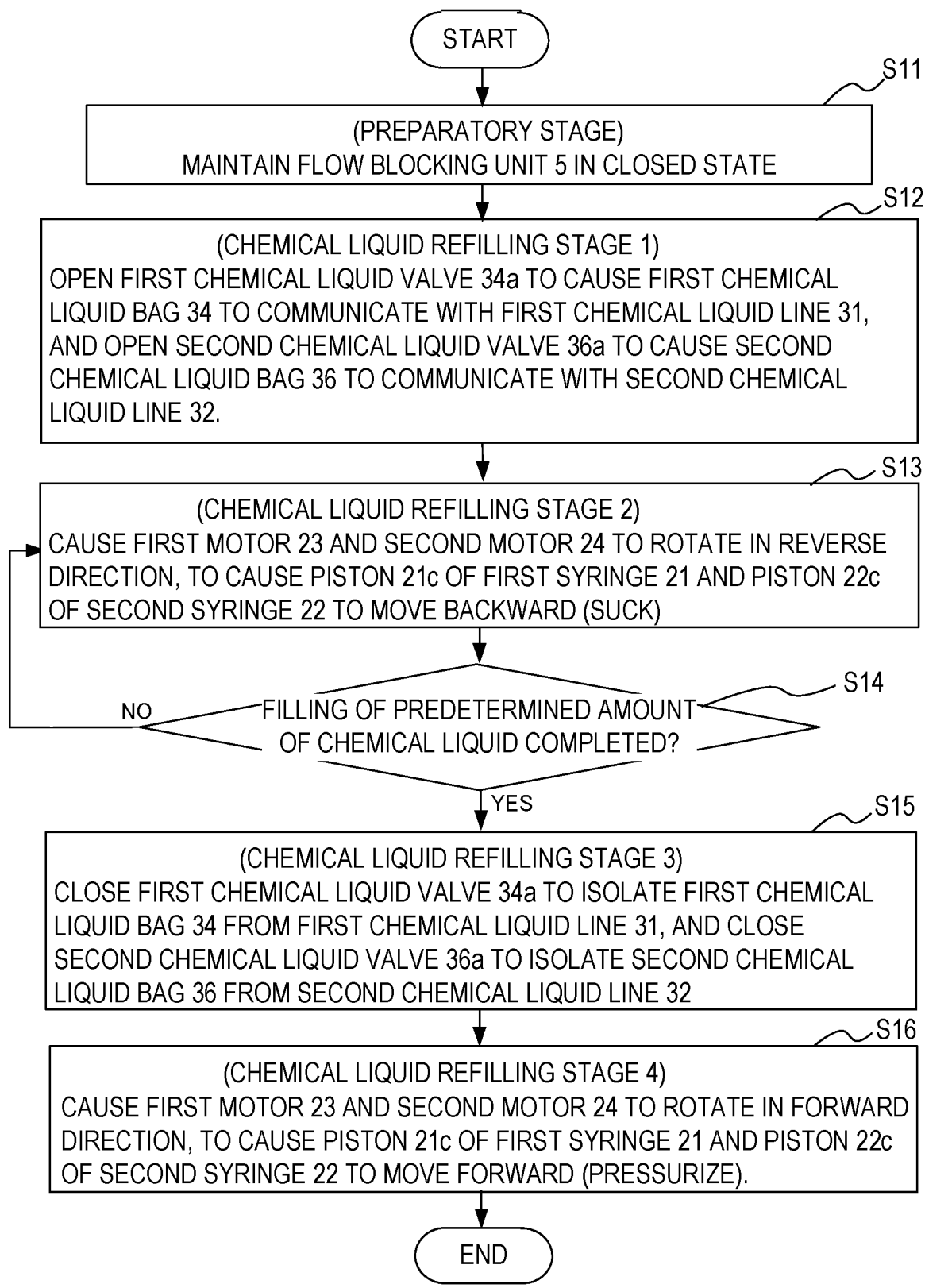
FIG. 10 is a view illustrating a flowchart of a chemical liquid refilling sequence of another embodiment of the chemical liquid injecting apparatus of the present invention.

Next, another embodiment of the present invention will now be described. The embodiment described here has the same configuration as the chemical liquid injecting apparatus 1a of Example 1 of the embodiment of the present invention described above. This embodiment is a sequence which, with respect to the flowchart in FIG. 3B, at a stage in which a predetermined amount of chemical liquid has not yet been injected, is after the pressure inside the chemical liquid injection conduit becomes the predetermined pressure (Psafe) (time point at which time period T4 elapsed) and the flow blocking unit 5 is placed in a closed state before injection of the chemical liquid is completed. That is, this embodiment is a sequence that refills the first chemical liquid in the first syringe 21 and refills the second chemical liquid in the second syringe 22 because a predetermined amount of the chemical liquid has not yet been injected. This embodiment will be described referring to FIG. 10. Here, the embodiment will be described referring to the configuration of the aforementioned apparatus of Example 1 of the embodiment of the present invention as it is. FIG. 10 illustrates a flowchart of a sequence that refills a chemical liquid into the first syringe 21 or the second syringe 22.

When the pressure inside the chemical liquid injection conduit decreases to the predetermined pressure (Psafe), the control device 40 issues a command to place the flow blocking unit 5 in a closed state, and the flow blocking unit 5 enters the closed state (S7 in FIG. 3B). This embodiment proceeds from after this step. First, upon confirming that the flow blocking unit 5 is in the closed state, the flow blocking unit 5 is maintained in the closed state (S11). Next, the first chemical liquid valve 34a is opened to cause the first chemical liquid bag 34 to communicate with the first chemical liquid line 31, and the second chemical liquid valve 36a is opened to cause the second chemical liquid bag 36 to communicate with the second chemical liquid line 32 (S12). In a case where a one-way valve, and not an open/close valve, is adopted as the first chemical liquid valve 34a and the second chemical liquid valve 36a, the process of opening the first chemical liquid valve 34a and the second chemical liquid valve 36a (S12) is not required. Since the flow blocking unit 5 is closed, in the first chemical liquid line 31 and the second chemical liquid line 32, respectively, there is a pressure gradient enabling a flow toward the first syringe 21 through the first chemical liquid line 31 from the first chemical liquid bag 34 and a pressure gradient enabling a flow toward the second syringe 22 through the second chemical liquid line 32 from the second chemical liquid bag 36. In this state, a command to rotate in the reverse direction is issued to the first motor 23 and the second motor 24 from the central processing unit (CPU) 41 of the control device 40. The first motor 23 and the second motor 24 that received the command cause the piston 21c of the first syringe 21 or the piston 22c of the second syringe 22 to move backward according to a predetermined sequence.

As a result, the pressure inside the chemical liquid injection conduit that includes the first syringe 21 or the second syringe 22 gradually decreases, and the first chemical liquid is sucked from the first chemical liquid line 31 into the first syringe 21, and the second chemical liquid is sucked into the second syringe 22 of the second chemical liquid line 32 (S13). It is determined whether or not a predetermined amount of the first chemical liquid was filled into the first syringe 21 and a predetermined amount of the second chemical liquid was filled into the second syringe 22, and if the respective predetermined amounts have not yet been filled, the filling operation is continued further, while if the predetermined amount of the first chemical liquid has been filled into the first syringe 21 and the predetermined amount of the second chemical liquid has been filled into the second syringe 22, the filling is completed (S14). At the stage when the first chemical liquid is filled by the predetermined amount into the first syringe 21 and the second chemical liquid is filled by the predetermined amount into the second syringe 22 and filling is completed, the first chemical liquid valve 34a is closed to isolate the first chemical liquid bag 34 from the first chemical liquid line 31, and the second chemical liquid valve 36a is closed to isolate the second chemical liquid bag 36 from the second chemical liquid line 32 (S15). In a case where a one-way valve, and not an open/close valve, is adopted for each of the first chemical liquid valve 34a and the second chemical liquid valve 36a, the process of closing the first chemical liquid valve 34a and the second chemical liquid valve 36a (S15) is not required. At this time, because the first syringe 21 or the second syringe 22 is performing suction, it is also possible for a case to occur in which, within the conduit of the common conduit portion 30, the possibility arises of the pressure in the conduit becoming lower locally (for example, at the location D2 in FIG. 1) than the intravascular pressure of the subject, and body fluid of the subject flow backing as far as the common conduit portion 30. Consequently, at the stage at which first chemical liquid has been filled by the predetermined amount into the first syringe 21 and the second chemical liquid has been filled by the predetermined amount into the second syringe 22 and filling is completed, it is necessary to pressurize the inside of the conduit of the common conduit portion 30 until reaching the predetermined pressure (Psafe) higher than the intravascular pressure of the subject. Therefore, a command to rotate in the forward direction is issued to the first motor 23 and the second motor 24 from the central processing unit (CPU) 41 of the control device 40. The first motor 23 and the second motor 24 that received the command cause the piston 21c of the first syringe 21 or the piston 22c of the second syringe 22 to move forward according to a predetermined sequence to pressurize the inside of the conduit of the common conduit portion 30 until reaching the predetermined pressure (Psafe) higher than the intravascular pressure of the subject (S16). When pressurizing the inside of the conduit of the common conduit portion 30 until reaching the predetermined pressure (Psafe) higher than the intravascular pressure of the subject, the pressure inside the chemical liquid injection conduit may be measured, or a method which does not directly measure the pressure inside the chemical liquid injection conduit can be adopted as it is in the same manner as in the case of the timing for sending a command in the step (S3) in which the control device 40 places the flow blocking unit 5 in an open state allowing a flow of the chemical liquid and the step (S7) in which the control device 40 places the flow blocking unit 5 in a closed state blocking a flow of the chemical liquid in Example 1. In this stage, the pressure in the common conduit portion 30 becomes higher than the pressure on the replaceable conduit portion 10 side, and body fluid of the subject does not flow back as far as the common conduit portion 30. It is possible to resume the sequence from S1 in FIG. 3B from this point.

This application claims the benefit of priority from Japanese Patent Application No. 2018-124918, filed Jun. 29, 2018, which is hereby incorporated by reference herein in its entirety.

REFERENCE SIGNS LIST 1a, 1b, 1c, 1d chemical liquid injecting apparatus
5 flow blocking unit
6 driving means
10 replaceable conduit portion
11 piercing member
12 injection tube
15 mixing device
18 mixture supply tube
20 chemical liquid injector
23, 24 drive motor
25, 26 pressing member
27 control circuit
28, 29 load cell
30 common conduit portion
40 control device
41 central processing unit
61, 71 first container
62, 72 second container
73 first pressurizing body
74 second pressurizing body
83, 84 roller pump
85 rotary body

The invention claimed is:

1. A chemical liquid injecting apparatus for injecting a chemical liquid into a subject, comprising:
    a chemical liquid injector discharging the chemical liquid according to a preset injection sequence which defines a time at which injection of the chemical liquid by the chemical liquid injector is started until the injection of the chemical liquid by the chemical liquid injector is completed;
    a flow blocking unit arranged with a conduit through which the chemical liquid flows, the flow blocking unit configured to be switchable between an open state allowing a flow of the chemical liquid and a closed state blocking the flow of the chemical liquid, and the flow blocking unit having a member that sandwiches the conduit or having a shut-off valve arranged within the conduit; and
    a control device configured to control the chemical liquid injector, to determine a time point of a completion timing, at which the injection of the chemical liquid by the chemical liquid injector is completed as defined in the preset injection sequence, and to control the flow blocking unit simultaneous with the completion timing so that the flow blocking unit starts blocking the flow of the chemical liquid, and to control the flow blocking unit so that the flow blocking unit is placed in the closed state during a time period from the completion timing.

2. A chemical liquid injecting apparatus according to claim 1, wherein, from the completion timing to when the flow blocking unit is in the closed state, a state, in which a pressure on an upstream side of the flow blocking unit is high, is ensured in the time period.

3. A chemical liquid injecting apparatus according to claim 1, wherein the flow blocking unit is placed in the closed state by members that sandwich the conduit.

4. A chemical liquid injecting apparatus according to claim 1,
    wherein the flow blocking unit is a shut-off valve arranged in the conduit, and has a valve housing and a piston which is received and supported by the valve housing and which is moveable between a position in the open state and a position in the closed state,
    wherein the piston has a head portion protruding from the valve housing, and
    wherein a flow path that extends along a flow direction of the chemical liquid perforates the piston.

5. A chemical liquid injecting apparatus according to claim 1, comprising:
    a drive motor that imparts a pressing force to the chemical liquid injector for discharging the chemical liquid, and
    wherein the chemical liquid injector has an outer cylinder, and a piston that is inserted into the outer cylinder and is moved relative to the outer cylinder to push out the chemical liquid.

6. A chemical liquid injecting apparatus according to claim 1, wherein the shut-off valve includes one or more pistons, and the control device controls the flow blocking unit simultaneous with the completion timing so that the one or more pistons start moving.

7. A chemical liquid injecting apparatus according to claim 6, wherein the control device controls the flow blocking unit so as to complete the moving of the one or more pistons after elapsing the time period from the completion timing.

8. A chemical liquid injecting apparatus according to claim 1, comprising:
   a piercing member to be introduced into a blood vessel of the subject; and
   a replaceable conduit which is connected to the piercing member, and through which the chemical liquid flows.

9. A chemical liquid injecting apparatus for injecting a chemical liquid into a subject, comprising:
   a chemical liquid injector discharging the chemical liquid according to a preset injection sequence which defines a time at which injection of the chemical liquid by the chemical liquid injector is started until the injection of the chemical liquid by the chemical liquid injector is completed;
   a flow blocking unit arranged with a conduit through which the chemical liquid flows, the flow blocking unit configured to be switchable between an open state allowing a flow of the chemical liquid and a closed state blocking the flow of the chemical liquid, and the flow blocking unit having a member that sandwiches the conduit or having a shut-off valve arranged within the conduit; and
   a control device configured to control the chemical liquid injector, to determine a time point of a start timing, at which the injection of the chemical liquid by the chemical liquid injector is started as defined in the preset injection sequence, and a completion timing, at which the injection of the chemical liquid by the chemical liquid injector is completed as defined in the preset injection sequence, and to control the flow blocking unit so that the flow blocking unit is placed in the open state after elapsing a first time period from the start timing, and to control the flow blocking unit so that the flow blocking unit is placed in the closed state after elapsing a second time period from the completion timing.

* * * * *